US012004117B2

(12) United States Patent
Ni et al.

(10) Patent No.: US 12,004,117 B2
(45) Date of Patent: Jun. 4, 2024

(54) LMF SELECTION METHOD AND TERMINAL LOCATION SERVICE METHOD AND DEVICE

(71) Applicant: DATANG MOBILE COMMUNICATIONS EQUIPMENT CO.,LTD., Beijing (CN)

(72) Inventors: Chunlin Ni, Beijing (CN); Jing Fu, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 290 days.

(21) Appl. No.: 17/442,112

(22) PCT Filed: Mar. 19, 2020

(86) PCT No.: PCT/CN2020/080257
§ 371 (c)(1),
(2) Date: Sep. 22, 2021

(87) PCT Pub. No.: WO2020/199935
PCT Pub. Date: Oct. 8, 2020

(65) Prior Publication Data
US 2022/0167302 A1    May 26, 2022

(30) Foreign Application Priority Data
Apr. 2, 2019   (CN) .......................... 201910262781.4

(51) Int. Cl.
*H04W 4/029*        (2018.01)
*H04W 8/14*         (2009.01)
(Continued)

(52) U.S. Cl.
CPC ......... *H04W 64/003* (2013.01); *H04W 4/029* (2018.02); *H04W 8/14* (2013.01);
(Continued)

(58) Field of Classification Search
CPC ..... H04W 4/02–029; H04W 8/005–30; H04W 28/02–26; H04W 36/00–385;
(Continued)

(56) References Cited

U.S. PATENT DOCUMENTS

2018/0324740 A1    11/2018  Edge et al.
2020/0367022 A1*   11/2020  Tenny ................... H04W 4/029

FOREIGN PATENT DOCUMENTS

CN    109392085 A    2/2019
CN    110913473 A    3/2020
(Continued)

OTHER PUBLICATIONS

Qualcomm Incorporated et al., "Deferred 5GC-MT-LR Procedure for Solution 14", SA WG2 Meeting #129, Oct. 15-19, 2018, Dongguan, P. R. China, total 10 pages, S2-1810463.
(Continued)

*Primary Examiner* — Timothy J Weidner
(74) *Attorney, Agent, or Firm* — Kilpatrick Townsend & Stockton LLP

(57) ABSTRACT

Disclosed by the present application are a location management function (LMF) selection method and terminal location service method and device, said method includes a mobility management function entity, in response to a location service request message from a gateway mobile location center (GMLC), choosing a first LMF to provide a location service to the terminal, sending a confirm location request message to the first LMF, the first LMF being a core network LMF or an LLMF associated with a first access node; the mobility management entity, in response to the location redirection message from the first access node or a second access node, sending a confirm location request message to a second LMF, the second LMF being selected for the terminal by the first access node or the mobility management function entity, (Continued)

the second LMF being a core network LMF or an LLMF associated with the second access node.

7 Claims, 9 Drawing Sheets

(51) Int. Cl.

| | |
|---|---|
| *H04W 28/02* | (2009.01) |
| *H04W 36/00* | (2009.01) |
| *H04W 36/12* | (2009.01) |
| *H04W 36/32* | (2009.01) |
| *H04W 48/04* | (2009.01) |
| *H04W 64/00* | (2009.01) |
| *H04W 68/12* | (2009.01) |
| *H04W 84/02* | (2009.01) |
| *H04W 88/02* | (2009.01) |
| *H04W 88/08* | (2009.01) |
| *H04W 88/14* | (2009.01) |
| *H04W 88/16* | (2009.01) |
| *H04W 88/18* | (2009.01) |
| *H04W 92/02* | (2009.01) |
| *H04W 92/04* | (2009.01) |
| *H04W 92/06* | (2009.01) |
| *H04W 92/10* | (2009.01) |
| *H04W 92/20* | (2009.01) |
| *H04W 92/24* | (2009.01) |

(52) U.S. Cl.
CPC ... *H04W 28/0226* (2013.01); *H04W 36/0055* (2013.01); *H04W 36/12* (2013.01); *H04W 36/32* (2013.01); *H04W 48/04* (2013.01); *H04W 68/12* (2013.01); *H04W 84/02* (2013.01); *H04W 88/02* (2013.01); *H04W 88/08* (2013.01); *H04W 88/14* (2013.01); *H04W 88/16* (2013.01); *H04W 88/18* (2013.01); *H04W 92/02* (2013.01); *H04W 92/045* (2013.01); *H04W 92/06* (2013.01); *H04W 92/10* (2013.01); *H04W 92/20* (2013.01); *H04W 92/24* (2013.01)

(58) Field of Classification Search
CPC ... H04W 48/02–20; H04W 60/005–06; H04W 64/00–006; H04W 68/005–12; H04W 76/10–50; H04W 84/02–16; H04W 88/005–188; H04W 92/02–24
See application file for complete search history.

(56) References Cited

FOREIGN PATENT DOCUMENTS

| | | |
|---|---|---|
| KR | 20170072283 A | 6/2017 |
| KR | 20180081788 A | 7/2018 |
| WO | 2016182660 A1 | 11/2016 |
| WO | 2018129337 A1 | 7/2018 |

OTHER PUBLICATIONS

Huawei et al., "Update feature description of LMF selection", SA WG2 Meeting #131, Feb. 25-Mar. 1, 2019, Santa Cruz, Tenerife, Spain, total 2 pages, S2-1902092.

Huawei et al., "Correction of LMF selection and reselection", SAWG2 Meeting #133, May 13-May 17, 2019, Reno, NV, USA, total 4 pages, S2-1905192.

CATT, "Solution for Local LCS architecture", SA WG2 Meeting #129, Oct. 15-19, 2018, Dongguan, P. R. China, total 1 page, S2-1811108.

3GPP TS 23.273 V18.5.0 , 3rd Generation Partnership Project; Technical Specification Group Services and System Aspects; 5G System (5GS) Location Services (LCS); Stage 2 (Release 18), total 166 pages, Mar. 2024.

Nokia et al., "Deferred 5GC-MT-LR procedure for Solution 14 for Periodic and Triggered Location", Sa WG2 Meeting #129, Oct. 15-19, 2018, Dongguan, P. R. China, total 10 pages, S2-1810674.

\* cited by examiner

LMF SELECTION METHOD AND TERMINAL LOCATION SERVICE METHOD AND DEVICE

CROSS-REFERENCE OF RELATED APPLICATIONS

The present application is a National Stage of International Application No. PCT/CN2020/080257, filed on Mar. 19, 2020, which claims the priority from Chinese Patent Application No. 201910262781.4, filed with the Chinese Patent Office on Apr. 2, 2019 and entitled "LMF Selection Method and Terminal Location Service Method and Device", both of which are hereby incorporated by reference in their entireties.

FIELD OF DISCLOSURE

The present application relates to the field of wireless communication technology, and in particular to a Location Management Function (LMF) selection method, and a terminal location service method and device.

BACKGROUND

The Location Based Services (LBS) technology is a service technology of obtaining the terminal location information through a wireless communication network or other positioning systems and then providing terminals with various location-related information in combination with a geographic information system. At the present time, the outdoor location technology based on the Global Navigation Satellite System (GNSS) has been widely used in various fields. With the development of wireless communications, the high-precision location technology based on the Fourth Generation (4G) mobile communication network also effectively fills the gaps in the satellite navigation system location. At present, the mobile communication network has entered the Fifth Generation (5G) mobile communication technology era. Compared with the 4G location network architecture, the 5G location network architecture should have the location requirements of higher accuracy and lower latency.

BRIEF SUMMARY

Embodiments of the present application provide an LMF selection method and a terminal location service method and a device, to select an LMF capable of providing the location service for a target terminal when the terminal moves across nodes.

In a first aspect, an LMF selection method is provided, including: receiving, by a mobility management function entity, a location service request message from a Gateway Mobile Location Center (GMLC), and the location service request message is used to request to select an LMF for a target terminal; selecting, by the mobility management function entity, a first LMF to provide a location service for the target terminal in response to the location service request message, and sending a confirm location request message to the first LMF, and the first LMF is a core network LMF or a local LMF associated with a first access node; receiving, by the mobility management function entity, a location redirection message from the first access node or a second access node; and the location redirection message sent by the first access node is sent after the first access node requests at least the second access node to page the target terminal and determines that the target terminal currently resides on the second access node, and the location redirection message sent by the second access node is sent after the second access node pages the target terminal in response to a paging request of the first access node; sending, by the mobility management function entity, a confirm location request message to a second LMF in response to the location redirection message, and the second LMF is selected by the first access node or the mobility management function entity for the target terminal, and the second LMF is a core network LMF or a local LMF associated with the second access node; and receiving, by the mobility management function entity, a confirm location response message sent by the second LMF, and sending a location service response message to the GMLC, and the confirm location response message and the location service response message carry position information of the target terminal.

In one embodiment, the location service request message carries an identifier of the target terminal and location Quality of Service (QoS) information of the target terminal; and selecting, by the mobility management function entity, a first LMF to provide a location service for the target terminal in response to the location service request message, includes: selecting, by the mobility management function entity, the first LMF to provide the location service for the target terminal according to the location QoS information and location capabilities of LMFs managed by the mobility management function entity in response to the location service request message.

In one embodiment, the confirm location request message sent to the first LMF and the confirm location request message sent to the second LMF carry an identifier of the target terminal and location service information of the target terminal, and the location service information includes at least a location session identifier and location QoS information of the target terminal.

In one embodiment, the location redirection message carries an identifier of the second access node and an identifier of the target terminal.

In one embodiment, the mobility management function entity is an Access mobility Management Function (AMF) entity or a Mobility Management Function (MME) entity.

In a second aspect, an LMF selection method is provided, including: requesting, by a first access node, at least a second access node to page a target terminal when a first LMF selected by a mobility management function entity for the target terminal initiates a location service process of the target terminal; and the first LMF is a core network LMF or a local LMF associated with the first access node; and sending, by the first access node, location service information of the target terminal to the second access node or a location redirection message to the mobility management function entity after receiving a context request message sent by the second access node after paging the target terminal, and the location redirection message is used to notify the first access node of a second LMF associated with the second access node selected for the target terminal or request the mobility management function entity to reselect an LMF for the target terminal.

In one embodiment, before the first access node requests at least the second access node to page the target terminal, the method further includes: receiving, by the first access node, a confirm location request message sent by the mobility management function entity, and the confirm location request message carries an identifier of the target terminal and the location service information of the target terminal.

In one embodiment, sending, by the first access node, location service information of the target terminal to the second access node after receiving a context request message sent by the second access node after paging the target terminal, includes: sending, by the first access node, a context response message to the second access node after receiving a context request message sent by the second access node after paging the target terminal, and the context response message carries context information of the target terminal and location service information of the target terminal; or sending, by the first access node, a context response message and a location redirection message to the second access node after receiving a context request message sent by the second access node after paging the target terminal, and the context response message carries context information of the target terminal, and the location redirection message carries location service information of the target terminal.

In one embodiment, requesting, by the first access node, at least a second access node to page the target terminal, includes: requesting, by the first access node, an access node in a notification area where the first access node is located to page the target terminal, and the notification area where the first access node is located includes the second access node.

In one embodiment, the location service information includes at least a location session identifier and location QoS information of the target terminal.

In one embodiment, the location redirection message carries an identifier of the second access node and an identifier of the target terminal.

In a third aspect, a terminal location service method is provided, including: paging, by a second access node where a target terminal currently resides, the target terminal after receiving a paging request sent by a first access node where the target terminal originally resided; and the paging request is sent by the first access node when a first LMF initiates a location service process of the target terminal, the first LMF is a core network LMF or a local LMF associated with the first access node, and the first LMF is selected by a mobility management function entity to provide a location service for the target terminal; and receiving, by the second access node, location service information of the target terminal sent by the first access node or the mobility management function entity, so that a local LMF associated with the second access node initiates a location service process of the target terminal after the second access node establishes an RRC connection with the target terminal.

In one embodiment, before the second access node receives the location service information of the target terminal sent by the mobility management function entity, the method further includes: sending, by the second access node, a location redirection message to the mobility management function entity; and receiving, by the second access node, location service information of the target terminal sent by the mobility management function entity, includes: receiving, by the second access node, a location redirection response message sent by the mobility management function entity in response to the location redirection message, and the location redirection response message carries the location service information of the target terminal.

In one embodiment, the method further includes: sending, by the second access node, a context request message to the first access node after paging the target terminal; and receiving, by the second access node, location service information of the target terminal sent by the first access node, includes: receiving, by the second access node, a context response message sent by the first access node, and the context response message carries context information of the target terminal and location service information of the target terminal; or receiving, by the second access node, a context response message and a location redirection message sent by the first access node, and the context response message carries context information of the target terminal, and the location redirection message carries location service information of the target terminal.

In one embodiment, the location service information includes at least a location session identifier and location QoS information of the target terminal.

In one embodiment, the location redirection message carries an identifier of the second access node and an identifier of the target terminal.

In a fourth aspect, a mobile management function entity device is provided, including a receiving device, a processing device and a sending device; and: the receiving device is configured to: receive a location service request message from a GMLC, and the location service request message is used to request to select an LMF for a target terminal; the processing device is configured to: select a first LMF to provide a location service for the target terminal in response to the location service request message, and send a confirm location request message to the first LMF through the sending device, and the first LMF is a core network LMF or a local LMF associated with a first access node; the receiving device is further configured to: receive a location redirection message from the first access node or a second access node; and the location redirection message sent by the first access node is sent after the first access node requests at least the second access node to page the target terminal and determines that the target terminal currently resides on the second access node, and the location redirection message sent by the second access node is sent after the second access node pages the target terminal in response to a paging request of the first access node; the processing device is further configured to: send a confirm location request message to a second LMF through the sending device in response to the location redirection message, and the second LMF is selected by the first access node or the mobility management function entity for the target terminal, and the second LMF is a core network LMF or a local LMF associated with the second access node; the receiving device is further configured to: receive a confirm location response message sent by the second LMF, and the confirm location response message carries position information of the target terminal; and the sending device is further configured to: send a location service response message to the GMLC after receiving the confirm location response message sent by the second LMF, and the location service response message carries the position information of the target terminal.

In one embodiment, the location service request message carries an identifier of the target terminal and location QoS information of the target terminal;

the processing device selects the first LMF to provide the location service for the target terminal in response to the location service request message, including:
the processing device selects the first LMF to provide the location service for the target terminal according to the location QoS information and location capabilities of LMFs managed by the mobility management function entity in response to the location service request message.

In one embodiment, the confirm location request message sent to the first LMF and the confirm location request message sent to the second LMF carry an identifier of the target terminal and location service information of the target terminal, and the location service information includes at least a location session identifier and location QoS information of the target terminal.

In one embodiment, the location redirection message carries an identifier of the second access node and an identifier of the target terminal.

In one embodiment, the mobility management function entity is an Access mobility Management Function (AMF) entity or a Mobility Management Function (MME) entity.

In a fifth aspect, an access node device is provided, including: a receiving device, a processing device and a sending device; and: the processing device is configured to: request at least a second access node to page a target terminal through the sending device when a first LMF selected by a mobility management function entity for the target terminal initiates a location service process of the target terminal; and the first LMF is a core network LMF or a local LMF associated with the first access node; the receiving device is configured to: receive a context request message sent by the second access node after paging the target terminal; and the sending device is configured to: send location service information of the target terminal to the second access node or send a location redirection message to the mobility management function entity after receiving a context request message sent by the second access node after paging the target terminal, and the location redirection message is used to notify the first access node of a second LMF associated with the second access node selected for the target terminal or request the mobility management function entity to reselect an LMF for the target terminal.

In one embodiment, before the sending device requests at least the second access node to page the target terminal, the process further includes:
  the receiving device receives a confirm location request message sent by the mobility management function entity, and the confirm location request message carries an identifier of the target terminal and the location service information of the target terminal.

In one embodiment, the sending device sends the location service information of the target terminal to the second access node after the receiving device receives the context request message sent by the second access node after paging the target terminal, including:
  the sending device sends a context response message to the second access node after the receiving device receives a context request message sent by the second access node after paging the target terminal, and the context response message carries context information of the target terminal and location service information of the target terminal; or
  the sending device sends a context response message and a location redirection message to the second access node after the receiving device receives a context request message sent by the second access node after paging the target terminal, and the context response message carries context information of the target terminal, and the location redirection message carries location service information of the target terminal.

In one embodiment, the sending device requests at least the second access node to page the target terminal, including:
  the sending device requests an access node in a notification area where the first access node is located to page the target terminal, and the notification area where the first access node is located includes the second access node.

In one embodiment, the location service information includes at least a location session identifier and location QoS information of the target terminal.

In one embodiment, the location redirection message carries an identifier of the second access node and an identifier of the target terminal.

In a sixth aspect, an access node device is provided, including: a receiving device, a processing device and a sending device; and: the processing device is configured to: page a target terminal through the sending device according to a paging request sent by a first access node where the target terminal originally resided and received by the receiving device; and the paging request is sent by the first access node when a first LMF initiates a location service process of the target terminal, the first LMF is a core network LMF or a local LMF associated with the first access node, and the first LMF is selected by a mobility management function entity to provide a location service for the target terminal; and the receiving device is further configured to: receive location service information of the target terminal sent by the first access node or the mobility management function entity, so that a local LMF associated with the second access node initiates a location service process of the target terminal after the second access node establishes an RRC connection with the target terminal.

In one embodiment, before the receiving device receives the location service information of the target terminal sent by the mobility management function entity, the process further includes:
  the sending device sends a location redirection message to the mobility management function entity;
  the receiving device receives the location service information of the target terminal sent by the mobility management function entity, including:
  the receiving device receives a location redirection response message sent by the mobility management function entity in response to the location redirection message, and the location redirection response message carries the location service information of the target terminal.

In one embodiment, the process further includes:
  the sending device sends a context request message to the first access node after paging the target terminal;
  the receiving device receives the location service information of the target terminal sent by the first access node, including:
  the receiving device receives a context response message sent by the first access node, and the context response message carries context information of the target terminal and location service information of the target terminal; or
  the receiving device receives a context response message and a location redirection message sent by the first access node, and the context response message carries context information of the target terminal, and the location redirection message carries location service information of the target terminal.

In one embodiment, the location service information includes at least a location session identifier and location QoS information of the target terminal.

In one embodiment, the location redirection message carries an identifier of the second access node and an identifier of the target terminal.

In a seventh aspect, a communication device is provided, including: a processor, a memory and a communication interface; and the memory is configured to store computer instructions; and the processor is configured to read a program in the memory to:

receive a location service request message from a Gateway Mobile Location Center, GMLC, and the location service request message is used to request to select an LMF for a target terminal;

select a first LMF to provide a location service for the target terminal in response to the location service request message, and send a confirm location request message to the first LMF, and the first LMF is a core network LMF or a local LMF associated with a first access node;

receive a location redirection message from the first access node or a second access node; and the location redirection message sent by the first access node is sent after the first access node requests at least the second access node to page the target terminal and determines that the target terminal currently resides on the second access node, and the location redirection message sent by the second access node is sent after the second access node pages the target terminal in response to a paging request of the first access node;

send a confirm location request message to a second LMF in response to the location redirection message, and the second LMF is selected by the first access node or the mobility management function entity for the target terminal, and the second LMF is a core network LMF or a local LMF associated with the second access node;

receive a confirm location response message sent by the second LMF, and send a location service response message to the GMLC, and the confirm location response message and the location service response message carry position information of the target terminal.

In one embodiment, the location service request message carries an identifier of the target terminal and location QoS information of the target terminal;

the processor is configured to select the first LMF to provide the location service for the target terminal in response to the location service request message, by:

selecting the first LMF to provide the location service for the target terminal according to the location QoS information and location capabilities of LMFs managed by the mobility management function entity in response to the location service request message.

In one embodiment, the confirm location request message sent by the processor to the first LMF and the confirm location request message sent to the second LMF carry an identifier of the target terminal and location service information of the target terminal, and the location service information includes at least a location session identifier and location QoS information of the target terminal.

In one embodiment, the location redirection message carries an identifier of the second access node and an identifier of the target terminal.

In one embodiment, the mobility management function entity is an Access mobility Management Function (AMF) entity or a Mobility Management Function (MME) entity.

In an eighth aspect, a communication device is provided, including: a processor, a memory and a communication interface; and the memory is configured to store computer instructions; and the processor is configured to read a program in the memory to:

request at least a second access node to page a target terminal when a first LMF selected by a mobility management function entity for the target terminal initiates a location service process of the target terminal; and the first LMF is a core network LMF or a local LMF associated with the first access node;

send location service information of the target terminal to the second access node or send a location redirection message to the mobility management function entity after receiving a context request message sent by the second access node after paging the target terminal, and the location redirection message is used to notify the first access node of a second LMF associated with the second access node selected for the target terminal or request the mobility management function entity to reselect an LMF for the target terminal.

In one embodiment, before requesting at least the second access node to page the target terminal, the processor is further configured to:

receive a confirm location request message sent by the mobility management function entity, and the confirm location request message carries an identifier of the target terminal and the location service information of the target terminal.

In one embodiment, when sending the location service information of the target terminal to the second access node after receiving the context request message sent by the second access node after paging the target terminal, the processor is configured to:

send a context response message to the second access node after receiving a context request message sent by the second access node after paging the target terminal, and the context response message carries context information of the target terminal and location service information of the target terminal; or send a context response message and a location redirection message to the second access node after receiving a context request message sent by the second access node after paging the target terminal, and the context response message carries context information of the target terminal, and the location redirection message carries location service information of the target terminal.

In one embodiment, the processor is configured to request at least the second access node to page the target terminal, by:

requesting an access node in a notification area where the first access node is located to page the target terminal, and the notification area where the first access node is located includes the second access node.

In one embodiment, the location service information includes at least a location session identifier and location QoS information of the target terminal.

In one embodiment, the location redirection message carries an identifier of the second access node and an identifier of the target terminal.

In a ninth aspect, a communication device is provided, including: a processor, a memory and a communication interface; and the memory is configured to store computer instructions; and the processor is configured to read a program in the memory to:

page a target terminal after receiving a paging request sent by a first access node where the target terminal originally resided; and the paging request is sent by the first access node when a first Location Management Function, LMF, initiates a location service process of the target terminal, the first LMF is a core network LMF or a local LMF associated with the first access node, and the first LMF is selected by a mobility management function entity to provide a location service for the target terminal;

receive location service information of the target terminal sent by the first access node or the mobility management function entity, so that a local LMF associated with the second access node initiates a location service process of the target terminal after the second access node establishes an RRC connection with the target terminal.

In one embodiment, before receiving the location service information of the target terminal sent by the mobility management function entity, the processor is further configured to:

send a location redirection message to the mobility management function entity;

when receiving the location service information of the target terminal sent by the mobility management function entity, the processor is configured to:

receive a location redirection response message sent by the mobility management function entity in response to the location redirection message, and the location redirection response message carries the location service information of the target terminal.

In one embodiment, the processor is further configured to: send a context request message to the first access node after paging the target terminal;

when receiving the location service information of the target terminal sent by the first access node, the processor is configured to:

receive a context response message sent by the first access node, and the context response message carries context information of the target terminal and location service information of the target terminal; or receive a context response message and a location redirection message sent by the first access node, and the context response message carries context information of the target terminal, and the location redirection message carries location service information of the target terminal.

In one embodiment, the location service information includes at least a location session identifier and location QoS information of the target terminal.

In one embodiment, the location redirection message carries an identifier of the second access node and an identifier of the target terminal.

In a tenth aspect, a computer readable storage medium is provided, where the storage medium stores computer instructions that, when executed by a processor, implement the method as described in any implementation in the first aspect.

In an eleventh aspect, a computer readable storage medium is provided, where the storage medium stores computer instructions that, when executed by a processor, implement the method as described in any implementation in the second aspect.

In a twelfth aspect, a computer readable storage medium is provided, where the storage medium stores computer instructions that, when executed by a processor, implement the method as described in any implementation in the third aspect.

In the above embodiments of the present application, after receiving the location service request message from the gateway location center, the mobility management entity selects the first LMF (the first LMF is an LMF associated with the first access node or a core network LMF) to provide the location service for the target terminal, and sends a confirm location request message to the first LMF, so that the first LMF initiates a location service process. But the target terminal has moved from the access node associated with the first LMF to the second access node in the notification area of the RAN where the first access node is located, and enters the RRC inactive state at the second access node, so that the first LMF cannot complete the location service for the target terminal and therefore triggers the first access node associated with the first LMF to request other access nodes to page the target terminal, and the local LMF associated with the second access node may provide the location service for the target terminal after the requested second access node pages the target terminal, or the core network LMF may be re-selected to provide the location service for the target terminal. In this way, when the terminal moves across nodes, the LMF that can provide the location service can be selected for the terminal to ensure that the location service process of the terminal can be performed.

BRIEF DESCRIPTION OF THE DRAWINGS

In order to illustrate the embodiments of the present application more clearly, the accompanying figures which need to be used in describing the embodiments will be introduced below briefly.

DETAILED DESCRIPTION OF THE EMBODIMENTS

The specific embodiments of the present application will be illustrated in detail below with reference to the drawings.

It should be understood that the specific embodiments described here are only used to illustrate and explain but not limit the present application.

It should be noted that "first" and "second" in the embodiments of the present application are used to distinguish similar objects, but not necessarily to describe a particular order or sequence.

Figure 1:
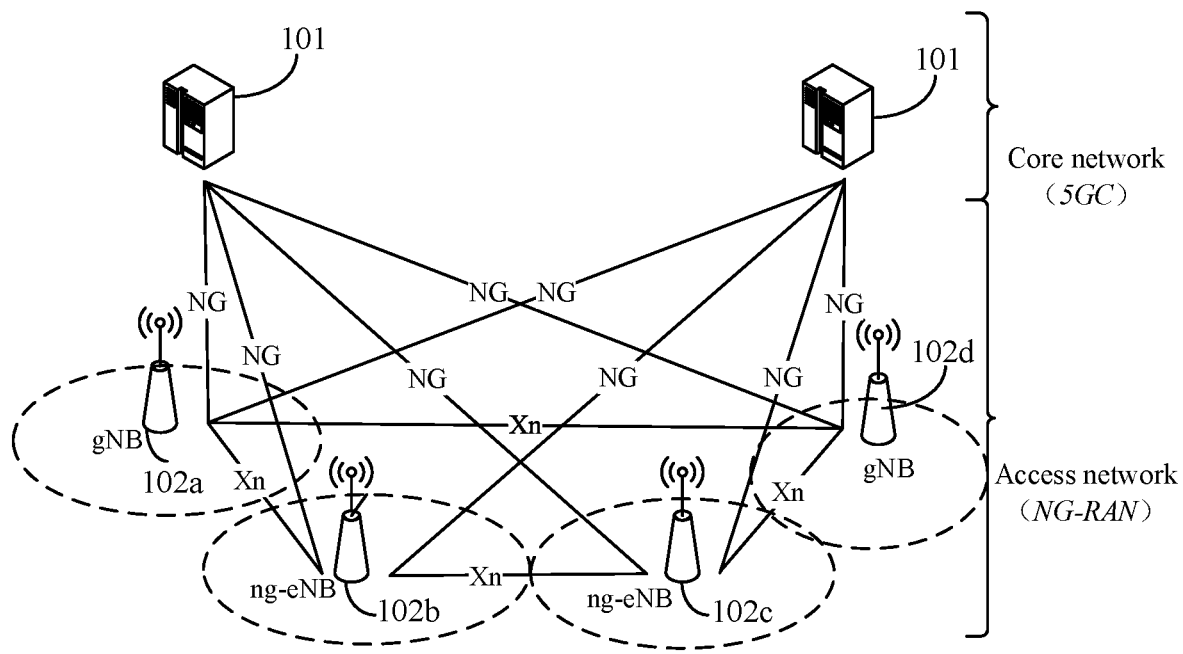
FIG. 1 is a structural schematic diagram of a 5G communication system applicable to the embodiments of the present application.

Referring to FIG. 1, it is a structural schematic diagram of a 5G communication system applicable to the embodiments of the present application. As shown in the figure, the 5G communication system includes 5G Core (5GC) network elements 101 and Next Generation Radio Access Network (NG-RAN) network elements (102a-102d), where the 5GC network elements 101 are connected with the NG-RAN network elements (102a-102d) through NG ports.

Here, the 5GC network elements include an Access and Mobility Management Function (AMF) entity for supporting the control plane functions such as access and mobility management, a Core Network Location Management Function (CN LMF) entity for providing the location service, and a User Plane Function (UPF) entity for supporting the user plane functions, and others (not shown in the figure).

The NG-RAN network elements include RAN nodes (102a-102d as shown in the figure). The RAN node includes a gNB that provides 5G network users with the wireless network user plane and control plane protocols and functions or an ng-eNB that provides 4G network users with the wireless network user plane and control plane protocols and functions. On the access network side, the gNB and ng-eNB, the gNB and gNB, and the ng-eNB and ng-eNB are connected through Xn ports.

It should be noted that the AMF entity is abbreviated as AMF, the LMF entity is abbreviated as LMF, and the UPF entity is abbreviated as UPF in the following description.

In practical applications, a terminal establishes an RRC connection with an RAN node (gNB or ng-eNB) in the access network through the Radio Resource Control (RRC) protocol, to realize the transmission of the radio access performance information of the terminal, the acquisition of the system information, the acquisition of radio resources, and the mobility management, etc.

In the 5G communication system, the RRC connection states of the terminal include: RRC connected (RRC_CONNECTED) state, RRC idle (RRC_IDLE) state, and RRC inactive (RRC_INACTIVE) state. The RRC_CONNECTED state means that the terminal establishes an RRC connection with an RAN node, the RRC_IDLE state means that the terminal has not established an RRC connection with an RAN node, and the RRC_INACTIVE state means that the RRC connection between the terminal and an RAN node is not activated.

When the terminal is in the RRC_INACTIVE state, the terminal remains in the Connection Management-CONNECTED (CM-CONNECTED) state, and the terminal can switch the RAN node in the RAN Notification Area (RNA) where the serving RAN node is located without notifying the AMF or Mobility Management Entity (MME). When the terminal is in the RRC_INACTIV state, the last RAN node serving the terminal retains the context information of the terminal and the NG interface connection of the terminal with the AMF and UPF. From the perspective of the core network, the terminal in the RRC_INACTIV state is the same as that in the RRC_CONNECTED state. When the terminal is in the RRC_INACTIVE state, if the last RAN node serving the terminal receives the downlink data from the UPF or the downlink signaling from the AMF, the RAN node will page the terminal in all cells in the RNA to which it belongs. If a cell of the RNA belongs to a neighboring gNB or ng-eNB, a paging request message (XnAP-RAN-Paging) is sent to the corresponding neighboring gNB or ng-eNB through the Xn port.

Taking the RAN node serving the terminal being gNB 102a as an example, the terminal is in the RRC_INACTIVE state. When the gNB 102a receives the downlink data from the UPF or the downlink signaling from the AMF, the gNB 102a pages the terminal in all cells in the RNA to which it belongs. All the cells include the cells within the jurisdiction of the gNB 102a (the range shown by the dashed box of the gNB 102a in FIG. 1) and the cells belonging to the ng-eNB 102b, gNB 102d, etc. in the notification range (not marked in FIG. 1) where the gNB 102a is located; the gNB 102a, on the one hand, pages the terminal within its jurisdiction, and on the other hand, sends a paging request message (XnAP-RAN-Paging) to RAN nodes such as ng-eNB 102b and gNB 102d through the Xn port; if the terminal currently resides on the gNB 102a, then the gNB 102a re-establishes an RRC connection with the terminal to respond to the downlink data from the UPF or the downlink signaling from the AMF; if the terminal does not currently reside on the gNB 102a, that is, the terminal in the RRC_INACTIVE state moves across nodes, then the gNB 102a sends a paging request message (XnAP-RAN-Paging) to RAN nodes such as ng-eNB 102b and ng-eNB 102c through the Xn port, so that the RAN node where the terminal resides establishes an RRC connection with the terminal through the paging process to respond to the downlink data from the UPF or the downlink signaling from the AMF.

It should be noted that the above architecture is described by using the 5G system architecture as an example. The embodiments of the present application may also be applicable to 5G evolution systems, or applicable to other communication systems (such as 4G communication systems), or applicable to the system architecture of the hybrid networking of 5G systems and other communication systems (such as 4G systems), etc., which will not be listed one by one. For example, the mobility management may be implemented by the MME in a 4G communication system or a hybrid networking system of a 4G communication system and a 5G communication system.

Based on the above system structure, the CN LMF in the core network provides the location service for the terminals in the RRC_CONNECTED state through the RAN nodes under the cooperation of core network elements such as AMF or MME.

In a possible implementation situation, the LMF that provides the location service for a terminal in the RRC_CONNECTED state may be located in the core network, that is, CN LMF, or may be co-located with the RAN node of the access network, that is, local LMF (LLMF).

Figure 2:
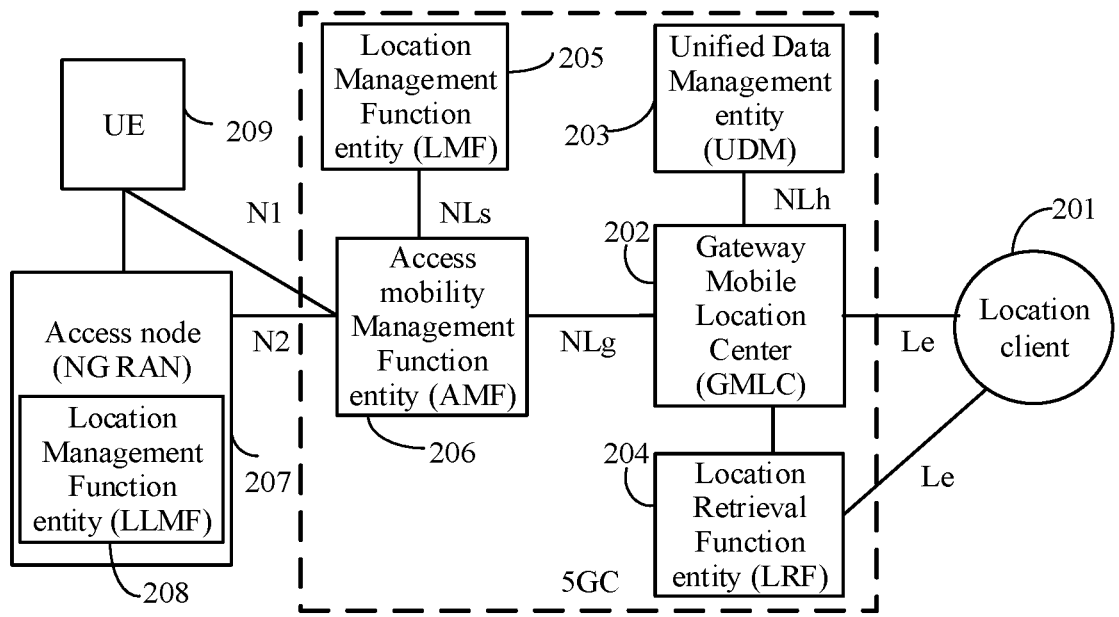
FIG. 2 is a structural schematic diagram of a location service network in the 5G network applicable to the embodiments of the present application.

Referring to FIG. 2, it is a structural schematic diagram of a location service network in the 5G network applicable to the embodiments of the present application. This figure exemplarily lists a part of network elements related to the embodiments of the present application, and the LMFs include a core network LMF (such as LMF 205 in the figure), and also includes a local LMF set on the access network side. There is an association between the local LMF and RAN nodes, for example, one local LMF can correspond to one or more RAN nodes. The local LMF may be co-located with an RAN node, so that the local LMF is associated with the RAN node with which it is co-located (for example, the LLMF 208 is co-located with the RAN node 207 in the figure).

Based on the system architecture shown in FIG. 2, the location service process of the terminal may include: a location client 201 initiates a location service request to the Gateway Mobile Location Center (GMLC) 202 through the Le port; the GMLC 202 interacts with the Unified Data Management (UDM) entity 203 through the NLh port to obtain the information related to the terminal 209 stored in the UDM 203, and interacts with the Location Retrieval Function (LRF) entity 204 to obtain the location service information related to the terminal 209; the GMLC 202 initiates a location service request to the AMF 206 through the NLg port; and the AMF 206 selects an LMF that provides the location service for the terminal 209 according to the network configuration and the information related to the terminal 209. If the AMF selects the CN LMF 205 to provide the location service for terminal 209, the AMF will initiate a location service request to the CN LMF 205 through the NLs port. If the AMF selects the LLMF 208 co-located with the RAN node 207 where the terminal 209 resides, the AMF will initiate a location service request to the LLMF 208 co-located with the RAN node 207 through the N2 port; the CN LMF 205 or LLMF 208 obtains the position information of the terminal 209 by interacting with the AMF 206, the RAN node 207 and the terminal 209, and finally sends the information to the location client 201 through the AMF 206 and GMLC 202. At this point, the acquisition of the position information of the terminal is completed.

In one embodiment, the aforementioned entity for mobility management may be an AMF or an MME.

It should be noted that the English abbreviations such as NG, Xn, NLh, NLs, N2 in the above embodiments are the communication interfaces or reference points for supporting the information transmission between device and device, between device and network element, and between network element and network element in the 5G network.

In the 5G network, the LLMF is introduced on the RAN node side. Compared with the CN LMF, the LLMF can provide terminals with the location service with higher accuracy and lower latency. When a terminal in the RRC_INACTIVE state moves across RAN nodes in the notification area where the original serving RAN node is located, if the location service was originally provided by the CN LMF for the terminal, the CN LMF that provides the location service for the terminal will not change because the terminal moves in the notification area where the original serving RAN node is located for the core network side. Of course, in order to provide the location service with higher accuracy and lower latency, the LLMF co-located with the RAN node where the terminal currently resides can be re-selected to provide the location service for the terminal; if the location service was originally provided by the LLMF co-located with the original serving RAN node for the terminal, the original serving RAN node does not know that the terminal has moved because the terminal is in the RRC_INACTIVE state, and then there is a need to reselect an LMF that provides the location service for the terminal, to ensure that the location service process of the terminal can be carried out.

In order to meet the location service requirements of high precision and low latency under the 5G location service network structure, an embodiment of the present application provides an LMF selection method, which can select the LMF that provides the location service for the terminal in the scenarios where the terminal moves across RAN nodes within the same RNA and is in the RRC_INACTIVE state.

Figure 3:
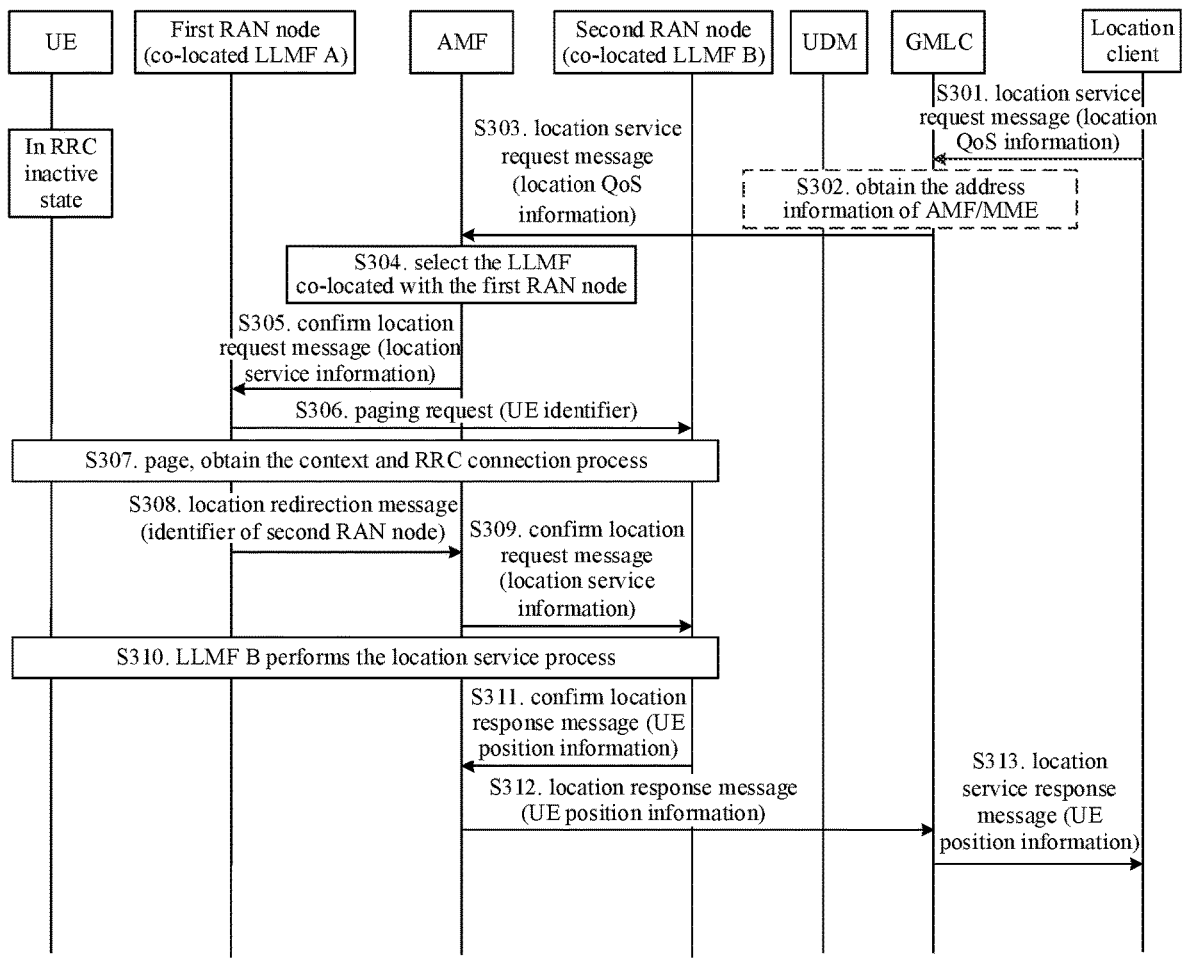
FIG. 3 is a signaling interaction diagram of an LMF selection method provided by an embodiment of the present application.

Referring to FIG. 3, it is a signaling interaction diagram of an LMF selection method provided by an embodiment of the present application. In this embodiment, the target terminal (UE) moves from the first access node to the second access node within the same RNA range, and the second access node is in the RRC_INACTIVE state. In this case, the location client initiates a location service request for the UE, and the AMF firstly selects a local LLMF co-located with the first access node to provide the location service for the UE. After learning that the UE currently resides on the second access node, the AMF or the first access node selects an LLMF co-located with the second access node to provide the location service for the UE.

Here, the access node may be an RAN node or a base station, etc., or other network element capable of implementing the network access function. The mobility management function entity can be an AMF or an MME or other network element capable of implementing the mobility management. In the following processes, the access node is an RAN node and the mobility management function entity is an AMF as an example for description.

As shown in the figure, the signaling interaction includes:

S301: a location client sends a location service request message to the GMLC, and the location service request message is used to request to obtain the position information of a target UE.

In one embodiment, the location service request message carries an identifier of the target UE and the location QoS information.

In one embodiment, the location service request message may be an LCS Service Request (location service request) message.

S302-S303: the GMLC sends a location service request message to the serving AMF of the target UE.

Here, the location service request message carries the identifier of the target UE and the location QoS information of the target UE.

In this step, before sending the location service request message, the GMLC obtains the AMF to which the target UE belongs (that is, the serving AMF of the target UE), to request it to provide the location for the UE. If the GMLC does not locally store the address information of the AMF to which the target UE belongs, the GMLC can obtain the address information of the AMF to which the target terminal belongs from the UDM (see S302). In one embodiment, in S302, the GMLC sends a UE context request message carrying the identifier of the target UE to the UDM, and receives a UE context response message returned by the UDM, and this response message carries the address information of the AMF to which the target UE belongs. If the GMLC locally stores the address information of the AMF to which the target UE belongs, S302 may not be performed.

In one embodiment, the location service request message sent by the GMLC to the AMF may be an Namf_Location_ProvideLocation Request message.

S304: after receiving the location service request message sent by the GMLC, the AMF selects an LMF for the target UE in response to the location service request message. Here, the AMF chooses to use the LLMF A co-located with the first RAN node to provide the location service for the target UE.

In one embodiment, the AMF may select an LMF for the target UE according to the original serving RAN node (first RAN node) of the target UE, the location QoS information, the location capabilities of LMFs in the area under the jurisdiction of the AMF, and the positioning type (such as instant positioning, delayed positioning, etc.).

In one embodiment, the AMF determines that the LLMF A co-located with the first RAN node meets the location QoS requirement according to the location capabilities of the LMFs (including at least the LLMF A co-located with the first RAN node, and the CN LMF in the core network) in the area under its jurisdiction, the location QoS information of the target UE, the registered RAN node (here, the first RAN node) of the target UE stored by the AMF, and the positioning type, etc., so the LLMF co-located with the first RAN node is selected and used to provide the location service for the target UE.

Here, the location capabilities of the LMFs in the area under the jurisdiction of the AMF may be stored locally in the AMF, or may not be stored locally in the AMF. If they are not stored locally in the AMF, the AMF can query the location capability information of the LMFs through the Network Repository Function (NRF).

It should be noted that the target UE moves from the first RAN node to the second RAN node in the same RNA, so the AMF does not update the registered RAN node of the UE, that is, the registered RAN node of the target UE stored in the AMF is still the first RAN node, and the information such as the context of the UE is still stored in the first RAN node.

S305: the AMF sends a confirm location request message to the first RAN node or the LLMF A co-located with the first RAN node according to the LLMF co-located with the first RAN node selected for the target UE.

Here, the confirm location request message carries the identifier of the target UE and the location service information of the target UE. In one embodiment, the location service information includes at least a location session identifier and the location QoS information. In one embodiment, the location service information further includes the positioning type.

In one embodiment, the location session identifier is allocated by the AMF and is used to identify the location process between the AMF and the LMF.

In this step, the AMF can send through the NLs/SLs interface between the AMF and LLME.

In one embodiment, the confirm location request message sent by the AMF to the LLMF may be an Nlmf_Location_DetermineLocation Request message.

S306: the first RAN node detects that the target UE is in the RRC_INACTIVE state, and then requests other RAN nodes including the second RAN node to page the target UE.

In this step, after receiving the confirm location request message, the LLMF A attempts to obtain the position information of the target UE by executing the location service process in response to the confirm location request message. Since there is no RRC connection between the target UE and the first RAN node, the location service process cannot be performed. In this case, the first RAN node sends a paging request (RAN Paging) to the RAN node in the RNA where the first RAN node is located, and the paging request carries the identifier of the target UE to request other RAN nodes to page the target UE, and the second RAN node is included in the RNA where the first RAN node is located.

S307: the second RAN node pages the target UE after receiving the paging request sent by the first RAN node, and then triggers the signaling interaction between the target UE and the second RAN node to complete the establishment or recovery of the RRC connection, and the signaling interaction between the second RAN node and the first RAN node to complete the acquisition of the UE context information.

In one embodiment, the second RAN node pages the UE in response to the received paging request; and after receiving the paging message, the UE sends an RRC reconnection request message (RRC Resume Request) to the second RAN node where it resides, to request the recovery of the RRC connection with the second RAN node. In response to the received RRC reconnection request message, the second RAN node sends a context request message to the original serving node of the UE (the first RAN node), where the context request message carries the UE identifier to request the context information of the UE, and the context information is the configuration information (such as authentication information, bear information, etc.) for establishing a communication link with the UE. After receiving the context request message, the first RAN node sends a context response message to the second RAN node, where the context response message carries the context information of the UE. Then, after receiving the context response message, the second RAN node completes the re-establishment of the RRC connection with the UE according to the context information of the UE.

So far, the UE establishes or restores the RRC connection with the second RAN node, and the UE enters the RRC_CONNECTED state from the RRC_INACTIVE state.

In one embodiment, the context response message carries the location service information of the UE.

S308-S309: the first RAN node sends a location redirection message to the AMF, and the AMF sends a confirm location request message to the LLMF B co-located with the second RAN node.

In one embodiment, the confirm location request message may be an Nlmf_Location_DetermineLocation Request message.

S308-S309 may include two implementation modes.

In a first mode: the location redirection message sent by the first RAN node is a location redirection request message, such as an LMF Redirection Request message (LMF redirection request message), which is used to request the AMF to reselect an LMF that provides the location service for the UE. In this mode, after knowing that the target UE currently resides on the second RAN node (for example, after receiving the context request message sent by the second RAN node), the first RAN node determines that the LLMF co-located with the first RAN node cannot provide the location service for the target UE, and then sends a location redirection request message to the AMF to request the AMF to reselect an LMF that provides the location service for the UE. In one embodiment, the location redirection request message carries the identifier of the target UE and the identifier of the second RAN node where the target UE currently resides.

After receiving the location redirection request message, the AMF reselects an LMF for the target UE in response to the location redirection request message. Here, the AMF selects the LLMF B co-located with the second RAN node to provide the location service for the target UE.

In one embodiment, the AMF can determine that the LLMF B co-located with the second RAN node meets the location QoS requirement according to the location capability of the LLMF B co-located with the second RAN node where the target UE resides and the location QoS information, and thus choose to use the LLMF B co-located with the second RAN node to provide the location service for the UE.

In one embodiment, if the AMF determines that the location capabilities of both the LLMF B and the CN LMF satisfy the location QoS information, the AMF may select the LLMF B co-located with the second RAN node where the UE resides to provide the location service for the UE, because the LLMF co-located with the RAN node can provide the UE with the location service with high precision and low latency compared with the CN LMF.

In a second mode: the location redirection message sent by the first RAN node is a location redirection notification message, such as an LMF Redirection Notify message (LMF redirection notification message).

In one embodiment, after knowing that the target UE currently resides on the second RAN node (for example, after receiving the context request message sent by the second RAN node), the first RAN node determines that the LLMF B co-located with the second RAN node can satisfy the location QoS requirement of the target UE, and thus selects the LLMF B to provide the location service for the target UE and sends a location redirection notification message to the AMF, to notify the AMF that the LLMF B provides the location service for the target UE, that is, obtain the AMF's understanding through the location redirection notification message. In one embodiment, the location redirection notification message carries the identifier of the second RAN node and the identifier of the target UE.

The AMF has the right to authorize or refuse the LMF that provides the location service for the target UE, that is, the AMF has the right to refuse the LLMF B reselected by the first RAN node to provide the location service for the target UE. In this example, in response to the location redirection notification message, the AMF authorizes the LLMF B selected by the first RAN node (that is, allows the LLMF B selected by the first RAN node to provide the location service for the target UE), and sends a confirm location request message to the second RAN node or the LLMF B co-located with the second RAN node, to notify the LLMF B to provide the location service for the target UE. Further, the AME updates the stored serving RAN node of the UE from the first RAN node to the second RAN node.

Here, the first RAN node may store the configuration information of the second RAN node, and the configuration information of the second RAN node includes whether the second RAN node is configured with a co-located LLMF and the location capability of the LLMF B in the case when the co-located LLMF B is set, etc., so that the first RAN node can determine whether the LLMF B co-located with the second RAN node meets the location QoS requirement of the target UE. The first RAN node may also obtain the configuration information of the second RAN node in other ways. For example, the second RAN node may send the location capability information of the LLMF B co-located with the second RAN node to the first RAN node through a context request message.

In the foregoing mode 1 or 2, the confirm location request message sent by the AMF to the second RAN node may also be replaced by a redirection command (LMF Redirection Command). This command is used to instruct the LLMF B to provide the location service for the UE.

In one embodiment, the confirm location request message or the redirection command carries an identifier of the target UE and the location service information of the target UE, and the location service information includes at least a location session identifier and the location QoS information.

It should be noted that the second RAN node and the LLMF B are co-located, so S309 may be understood as: the AMF sends a confirm location request message or a redirection command directly to the LLMF B to trigger the LLMF B to provide the location service for the UE; or may be understood as: the AMF sends a confirm location request message or a redirection command to the second RAN node so that the second RAN node interacts with the LLMF B according to the confirm location request message or the redirection command to trigger the LLMF B to provide the location service for the UE.

S310: the LLMF B executes a location service process in response to the received confirm location request message or redirection command to obtain the position information of the target UE.

S311: the LLMF B sends a confirm location response message to the AMF after obtaining the position information of the UE, where the confirm location response message carries the position information of the UE.

In one embodiment, the confirm location response message sent by the LLMF B may be an Nlmf_Location_DetermineLocation Response message.

S312: the AMF sends a location service response message to the GMLC after receiving the confirm location response message, where the location service response message carries the position information of the UE.

In one embodiment, the location service response message sent by the AMF may be an Namf_Location_ProvideLocation Response message.

S313: the GMLC sends a location service response message to the location client after receiving the location service response message, where the location service response message carries the position information of the UE.

In one embodiment, the location service response message sent by the GMLC may be an LCS Service Response message.

It should be noted that S301 is an optional step. That is, the location service request for the target UE may be initiated by the location client, or may be actively initiated by the network side. For example, the GMLC needs to obtain the position information of the target UE based on the strategy or configuration of the network side, and then actively initiates a location service request for the target UE. This is not limited in the present application.

It should be noted that the signaling interaction sequence in the signaling interaction diagram is only an example, and does not strictly represent the sequence of signaling interaction in actual applications. For example, the RRC connection process between the target UE and the second RAN node in S307 can be performed after the first RAN node sends a location redirection message to the AMF (S308).

It should also be noted that the message naming in the signaling interaction diagram is only an example, and other naming methods may be used for naming, which is not limited in the present application.

In the above embodiments, after the AMF receives the location service request message from the GMLC, the AMF still retains the information of the original serving RAN node (the first RAN node) of the UE although the UE has moved from the first RAN node to the second RAN node in the same RNA and is in the RRC_INACTIVE state at the second RAN node, so the AMF selects the LLMF A co-located with the first RAN node and meeting the location requirement to provide the location service for the target UE according to the location capabilities of the LMFs under its jurisdiction, the information of the first RAN node and the location QoS information of the target UE; the first RAN node detects that the UE is in the RRC_INACTIVE state when the LLMF A is performing the location service process and determines through paging that the RAN node where the UE currently resides is the second RAN node, and then the first RAN node sends a location redirection message to the AMF, to notify the AMF that the LLMF B co-located with the second RAN node provides the location service or to request the AMF to reselect an LMF for the UE. Thus, for the case that the target UE in the RRC_INACTIVE state moves across nodes in the notification area where the original serving RAN node is located, the foregoing embodiment of the present application can be used to select an LMF meeting the location requirement for the UE.

Figure 4:
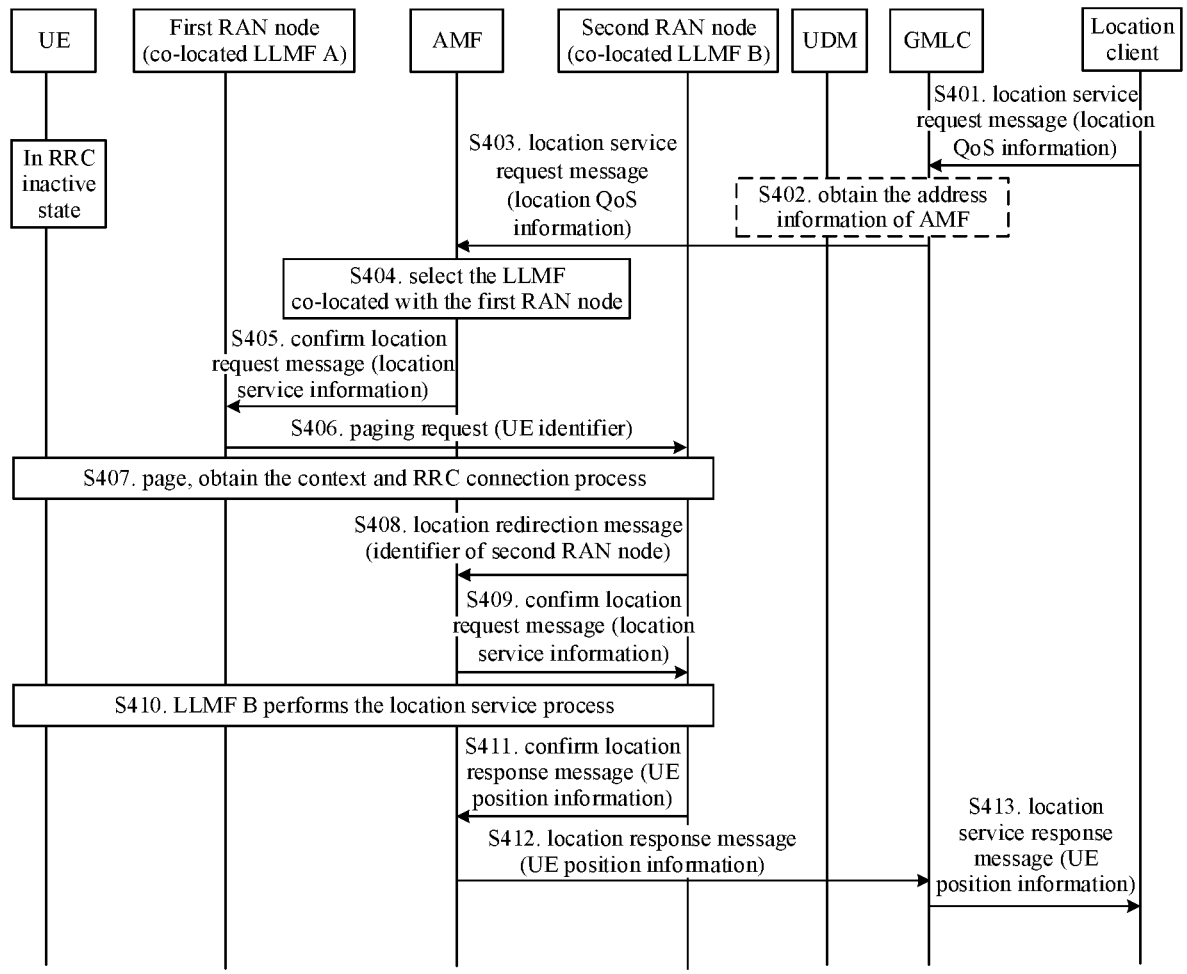
FIG. 4 is a signaling interaction diagram of an LMF selection method provided by an embodiment of the present application.

Referring to FIG. 4, it is a signaling interaction diagram of an LMF selection method provided by another embodiment of the present application. In this embodiment, the target terminal (UE) moves from the first access node to the second access node within the same RNA range, and the second access node is in the RRC_INACTIVE state. In this case, the location client initiates a location service request for the UE, and the AMF firstly selects a local LLMF co-located with the first access node to provide the location service for the UE. After learning that the UE currently resides on the second access node, the second access node or the AMF selects an LLMF co-located with the second access node to provide the location service for the UE.

Here, the access node may be an RAN node or a base station, etc., or other network element capable of implementing the network access function. The mobility management function entity can be an AMF or an MME or other network element capable of implementing the mobility management. In the following processes, the access node is an RAN node and the mobility management function entity is an AMF as an example for description.

As shown in the figure, the signaling interaction includes followings.

S401: a location client sends a location service request message to the GMLC, and the location service request message is used to request to obtain the position information of a target UE.

S402-S403: the GMLC sends a location service request message to the serving AMF of the target UE.

S404: after receiving the location service request message sent by the GMLC, the AMF selects an LMF for the target UE in response to the location service request message. Here, the AMF chooses to use the LLMF A co-located with the first RAN node to provide the location service for the target UE.

S405: the AMF sends a confirm location request message to the first RAN node or the LLMF A co-located with the first RAN node according to the LLMF co-located with the first RAN node selected for the target UE.

S406: the first RAN node detects that the target UE is in the RRC_INACTIVE state, and then requests other RAN nodes including the second RAN node to page the target UE.

The specific implementations involved in S401 to S406 above are the same as the specific implementations involved in S301 to S306 in FIG. 3, and will not be repeated here.

S407: the second RAN node pages the target UE after receiving the paging request sent by the first RAN node, and then triggers the signaling interaction between the target UE and the second RAN node to complete the establishment or activation of the RRC connection, and the signaling interaction between the second RAN node and the first RAN node to complete the acquisition of the UE context information.

The specific implementations involved in S407 above are the same as the specific implementations involved in S307 in FIG. 3, and will not be repeated here.

In one embodiment, the context response message sent by the first RAN node carries the location service information of the target UE. In one embodiment, if the context response message sent by the first RAN node does not carry the location service information of the target UE, the first RAN node sends a location redirection message carrying the location service information of the UE to the second RAN node, and the location redirection message sent by the first RAN node may be an LMF Redirection Notify message (LMF redirection notification message).

S408-S409: the LLMF B co-located with the second RAN node sends a location redirection message to the AMF, where the location redirection message carries the identifier of the target UE and the identifier of the second RAN node to request the AMF to re-select an LMF that provides the location service for the UE; and the AMF sends a confirm location request message to the LLMF B co-located with the second RAN node.

Here, since the second RAN node and the LLMF B are co-located, S408 may be understood as: the second RAN node sends a location redirection message to the AMF, where the location redirection message may carry the identifier of the second RAN node; or may be understood as: the LLMF B co-located with the second RAN node directly sends a location redirection message to the AMF, where the location redirection message may carry the identifier of the LLMF B.

In one embodiment, the confirm location request message may be an Nlmf_Location_DetermineLocation Request message.

S408-S409 may include two implementation modes.

In a first mode: the location redirection message sent by the second RAN node or its co-located LLMF B to the AMF is a location redirection notification message, such as an LMF Redirection Notify message (LMF redirection notification message).

In one embodiment, if the first RAN node selects the LLMF B co-located with the second RAN node to provide the location service for the target UE according to the configuration information of the second RAN node (the configuration information of the second RAN node includes whether the second RAN node is configured with a co-located LLMF and the location capability of the LLMF B in the case when the co-located LLMF B is set) in S407, then the location service information of the target UE is sent to the second RAN node.

In S408, the second RAN node sends a location redirection notification message to the AMF. Since the AMF has the right to authorize or refuse the LMF that provides the location service for the target UE, the LLMF B co-located with the second RAN node carries the event that the LLMF B provides the location service for the target UE in the location redirection notification message and sends it to the AMF to get the AMF's understanding in S408. In response to the location redirection notification message, the AMF authorizes the LLMF B selected by the first RAN node (that is, allows the LLMF B selected by the first RAN node to provide the location service for the target UE). Further, the AMF updates the information of the serving RAN node of the target UE.

In S409, the AMF sends a confirm location request message to the LLMF B co-located with the second RAN node to instruct the LLMF B to provide the location service for the target UE.

The second RAN node determines that its co-located LLMF B can meet the location QoS requirement of the target UE, and therefore determines that the LLMF B provides the location service for the target UE and sends a location redirection notification message to the AMF to notify the AMF that the LLMF B provides the location service for the target UE. In one embodiment, the location redirection notification message carries the identifier of the second RAN node and the identifier of the target UE.

The AMF has the right to authorize or refuse the LMF that provides the location service for the target UE, that is, the AMF has the right to refuse the LLMF B reselected by the first RAN node to provide the location service for the target UE. In this example, in response to the location redirect notification message, the AMF authorizes the LLMF B to provide the location service for the target UE, and sends a confirm location request message to the second RAN node or the LLMF B co-located with the second RAN node, to notify the LLMF B to provide the location service for the target UE. Further, the AME updates the stored serving RAN node of the UE from the first RAN node to the second RAN node.

In a second mode: the location redirection message sent by the second RAN node or its co-located LLMF B to the AMF is a location redirection request message, such as an LMF Redirection Require message (LMF redirection request message).

In this mode, the second RAN node sends a redirection request message to the AMF to request the AMF to reselect an LMF that provides the location service for the UE. In one embodiment, the location redirection request message carries the identifier of the target UE and the identifier of the second RAN node where the target UE currently resides.

After receiving the location redirection request message, the AMF reselects an LMF for the target UE in response to the location redirection request message. Here, the AMF selects the LLMF B co-located with the second RAN node to provide the location service for the target UE.

In one embodiment, the AMF can determine that the LLMF B co-located with the second RAN node meets the location QoS requirement according to the location capability of the LLMF B co-located with the second RAN node where the target UE resides and the location QoS information, and thus choose to use the LLMF B co-located with the second RAN node to provide the location service for the UE.

In one embodiment, if the AMF determines that the location capabilities of both the LLMF B and the CN LMF satisfy the location QoS information, the AMF may select the LLMF B co-located with the second RAN node where the UE resides to provide the location service for the UE, because the LLMF co-located with the RAN node can provide the UE with the location service with high precision and low latency compared with the CN LMF.

In the foregoing mode 1 or 2, the confirm location request message sent by the AMF to the second RAN node may also be replaced by a redirection command (LMF Redirection Command). This command is used to instruct the LLMF B to provide the location service for the UE.

In one embodiment, the confirm location request message or the redirection command carries an identifier of the target UE and the location service information of the target UE, and the location service information includes at least a location session identifier and the location QoS information.

S410: the LLMF B executes a location service process in response to the received confirm location request message or redirection command to obtain the position information of the target UE.

S411: the LLMF B sends a confirm location response message to the AMF after obtaining the position information of the UE, where the confirm location response message carries the position information of the UE.

S412: the AMF sends a location service response message to the GMLC after receiving the confirm location response message, where the location service response message carries the position information of the UE.

S413: the GMLC sends a location service response message to the location client after receiving the location service response message, where the location service response message carries the position information of the UE.

The specific implementations involved in S410 to S413 above are the same as the specific implementations involved in S310 to S313 in FIG. 3, and will not be repeated here.

At this point, the LLMF B re-selected by the AMF completes the location service provided for the UE.

It should be noted that S401 is an optional step. That is, the location service request for the target UE may be initiated by the location client, or may be actively initiated by the network side. For example, the GMLC needs to obtain the position information of the target UE based on the strategy or configuration of the network side, and then actively initiates a location service request for the target UE. This is not limited in the present application.

It should be noted that the signaling interaction sequence in the signaling interaction diagram is only an example, and does not strictly represent the sequence of signaling interaction in actual applications.

It should also be noted that the message naming in the signaling interaction diagram is only an example, and other naming methods may be used for naming, which is not limited in the present application.

In the above embodiments, the first RAN node detects that the target UE is in the RRC_INACTIVE state when the LLMF A is performing the location service process, determines through paging that the RAN node where the UE currently resides is the second RAN node, and then triggers the LLMF B co-located with the second RAN node to send a location redirection message to the AMF, to notify the AMF that the LLMF B co-located with the second RAN node provides the location service or to request the AMF to reselect an LMF for the UE. Thus, for the case that the target UE in the RRC_INACTIVE state moves across nodes in the notification area where the original serving RAN node is located, the foregoing embodiment of the present application can be used to select an LMF meeting the location requirement for the UE.

Figure 5:
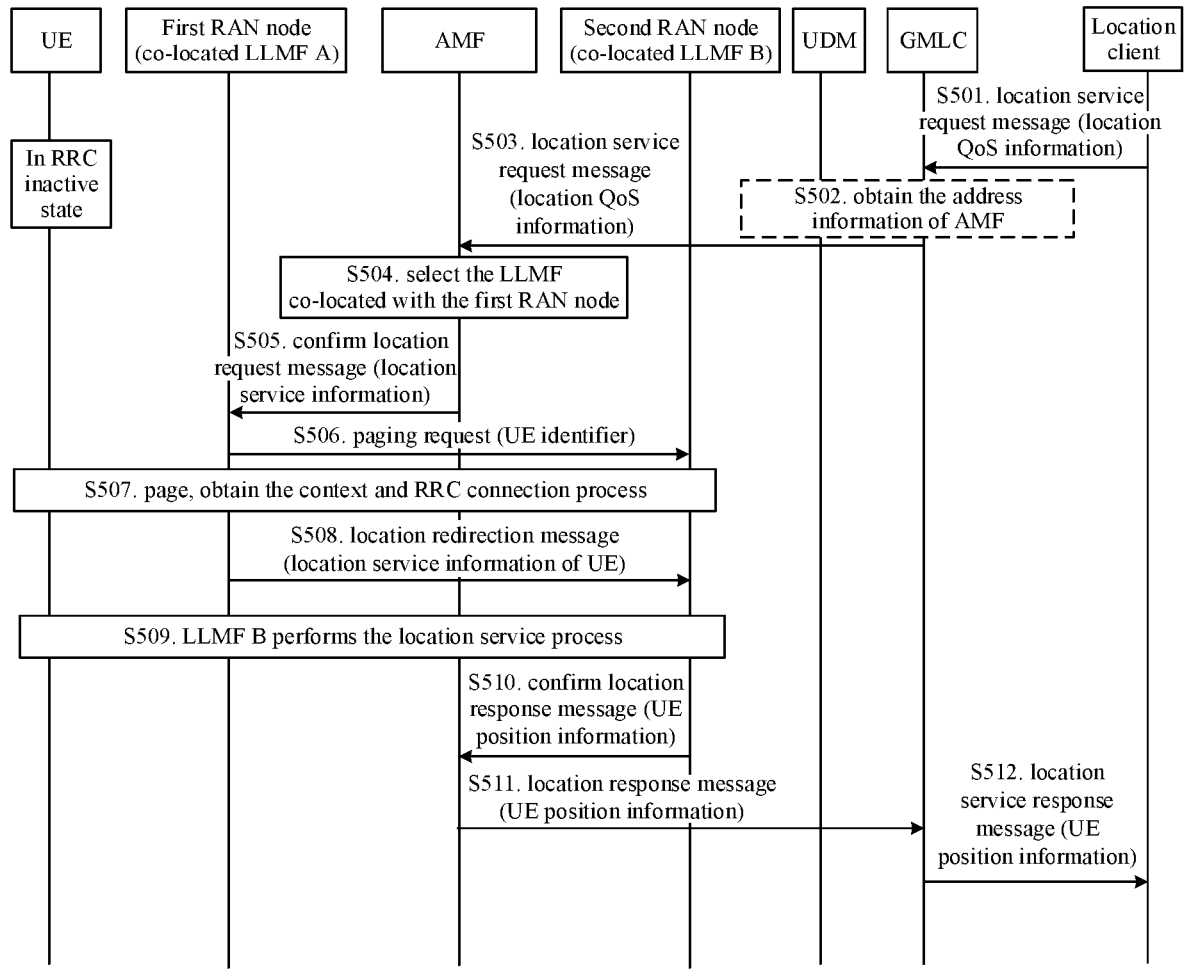
FIG. 5 is a signaling interaction diagram of an LMF selection method provided by an embodiment of the present application.

Referring to FIG. 5, it is a signaling interaction diagram of an LMF selection method provided by an embodiment of the present application. In this embodiment, the target terminal (UE) moves from the first access node to the second access node within the same RNA range, and the second access node is in the RRC_INACTIVE state. In this case, the location client initiates a location service request for the UE, and the AMF firstly selects a local LLMF co-located with the first access node to provide the location service for the UE. After learning that the UE currently resides on the second access node, the first access node or the second access node determines that the LLMF co-located with the second access node provides the location service for the UE.

Here, the access node may be an RAN node or a base station, etc., or other network element capable of implementing the network access function. The mobility management function entity can be an AMF or an MME or other network element capable of implementing the mobility management. In the following processes, the access node is an RAN node and the mobility management function entity is an AMF as an example for description.

As shown in the figure, the signaling interaction includes followings.

S501: a location client sends a location service request message to the GMLC, and the location service request message is used to request to obtain the position information of a target UE.

S502-S503: the GMLC sends a location service request message to the serving AMF of the target UE.

S504: after receiving the location service request message sent by the GMLC, the AMF selects an LMF for the target UE in response to the location service request message. Here, the AMF chooses to use the LLMF A co-located with the first RAN node to provide the location service for the target UE.

S505: the AMF sends a confirm location request message to the first RAN node or the LLMF A co-located with the first RAN node according to the LLMF co-located with the first RAN node selected for the target UE.

S506: the first RAN node detects that the target UE is in the RRC_INACTIVE state, and then requests other RAN nodes including the second RAN node to page the target UE.

The specific implementations involved in S501 to S506 above are the same as the specific implementations involved in S301 to S306 in FIG. 3, and will not be repeated here.

S507: the second RAN node pages the target UE after receiving the paging request sent by the first RAN node, and then triggers the signaling interaction between the target UE and the second RAN node to complete the establishment or activation of the RRC connection, and the signaling interaction between the second RAN node and the first RAN node to complete the acquisition of the UE context information.

The specific implementations involved in S507 above are the same as the specific implementations involved in S307 in FIG. 3, and will not be repeated here.

S508: the first RAN node sends a location redirection message carrying the location service information of the target UE to the second RAN node, so that the second RAN node obtains the location service information of the UE.

In one embodiment, the location redirection message sent by the first RAN node may be a location redirection notification message, such as an LMF Redirection Notify message (LMF redirection notification message).

In a possible implementation, in S507, the first RAN node may select the LLMF B co-located with the second RAN node as the LMF that provides the location service for the target UE according to the configuration information of the second RAN node, and then send a location redirection message carrying the location service information of the target UE to the second RAN node.

Here, the configuration information of the second RAN node may include whether the second RAN node is configured with a co-located LLMF and the location capability information of the LLMF B in the case when the co-located LLMF B is set. The configuration information of the second RAN node may be stored on the first RAN node, or the configuration information of the second RAN node may be obtained in other ways. For example, the second RAN node may carry the configuration information of the second RAN node in the context request message and send it to the first RAN node.

It should be noted that S508 is an optional step. If the first RAN node sends a context response message carrying the location service information of the target UE to the second RAN node in S507, S508 may not be executed, or even if S508 is executed, the redirection message in S508 may not carry the location service information of the target UE.

In a possible implementation, the first RAN node sends the location service information of the target UE to the second RAN node through S507 or S508. If the second RAN node does not receive the indication information that the first RAN node selects the LLMF B to provide the location service for the target UE, the second RAN node can select the LLMF B to provide the location service for the target UE when determining that the LLMF B meets the location requirement according to the location service information of the target UE, the location capability of the LLMF B, etc.

In one embodiment, after the second RAN node receives the indication information that the LLMF B provides the location service for the UE or selects the LLMF B to provide the location service for the UE, the second RAN node can carry the event that the LLMF B provide the location service for the target UE in the location redirection message and send it to the AMF to obtain the AMF's understanding because the AMF has the ability to authorize or refuse to authorize the LMF that provide the location service for the target UE. After receiving the location redirection message, the AMF authorizes the LLMF B reselected by the second RAN node (that is, allows the LLMF B reselected by the second RAN node to provide the location service for the target UE) in response, sends a confirm location request message to the second RAN node or the LLMF B co-located with the second RAN node to notify that the LLMF B provides the location service for the target UE, and updates the information of the RAN node serving the target UE, and the location redirection message sent by the LLMF B co-located with the second RAN node may be an LMF Redirection Require message (LMF redirection request message).

The above confirm location request message sent by the AMF to the second RAN node may also be replaced by a redirection command (LMF Redirection Command). This command is used to instruct the LLMF B to provide the location service for the UE.

In one embodiment, the confirm location request message or the redirection command carries an identifier of the target UE and the location service information of the target UE, and the location service information includes at least a location session identifier and the location QoS information.

S509: the LLMF B executes a location service process in response to the received confirm location request message or redirection command to obtain the position information of the target UE.

S510: the LLMF B sends a confirm location response message to the AMF after obtaining the position information of the UE, where the confirm location response message carries the position information of the UE.

S511: the AMF sends a location service response message to the GMLC after receiving the confirm location response message, where the location service response message carries the position information of the UE.

S512: the GMLC sends a location service response message to the location client after receiving the location service response message, where the location service response message carries the position information of the UE.

The specific implementations involved in S509 to S512 above are the same as the specific implementations involved in S310 to S313 in FIG. 3, and will not be repeated here.

At this point, the LLMF B re-selected by the second RAN node completes the location service provided for the UE.

It should be noted that S501 is an optional step. That is, the location service request for the target UE may be initiated by the location client, or may be actively initiated by the network side. For example, the GMLC needs to obtain the position information of the target UE based on the strategy or configuration of the network side, and then actively initiates a location service request for the target UE. This is not limited in the present application.

It should be noted that the signaling interaction sequence in the signaling interaction diagram is only an example, and does not strictly represent the sequence of signaling interaction in actual applications.

It should also be noted that the message naming in the signaling interaction diagram is only an example, and other naming methods may be used for naming, which is not limited in the present application.

In the above embodiments, the first RAN node detects that the target UE is in the RRC_INACTIVE state when the LLMF A is performing the location service process, determines through paging that the RAN node where the UE currently resides is the second RAN node, so that the first RAN node or the second RAN node selects the LLMF B co-located with the second RAN node to provide the location service. Thus, for the case that the target UE in the RRC_INACTIVE state moves across nodes in the notification area where the original serving RAN node is located, the foregoing embodiment of the present application can be used to select an LMF meeting the location requirement for the UE.

In an achievable way, a location client initiates a location service request for a target UE, and the AMF firstly selects the CN LMF in the core network to provide the location service for the target UE. In this case, after knowing that the UE currently resides on the second RAN node, the second RAN node or the AMF may re-select the LLMF co-located with the second RAN node to provide the location service for the UE, as shown in FIG. 6.

Figure 6:
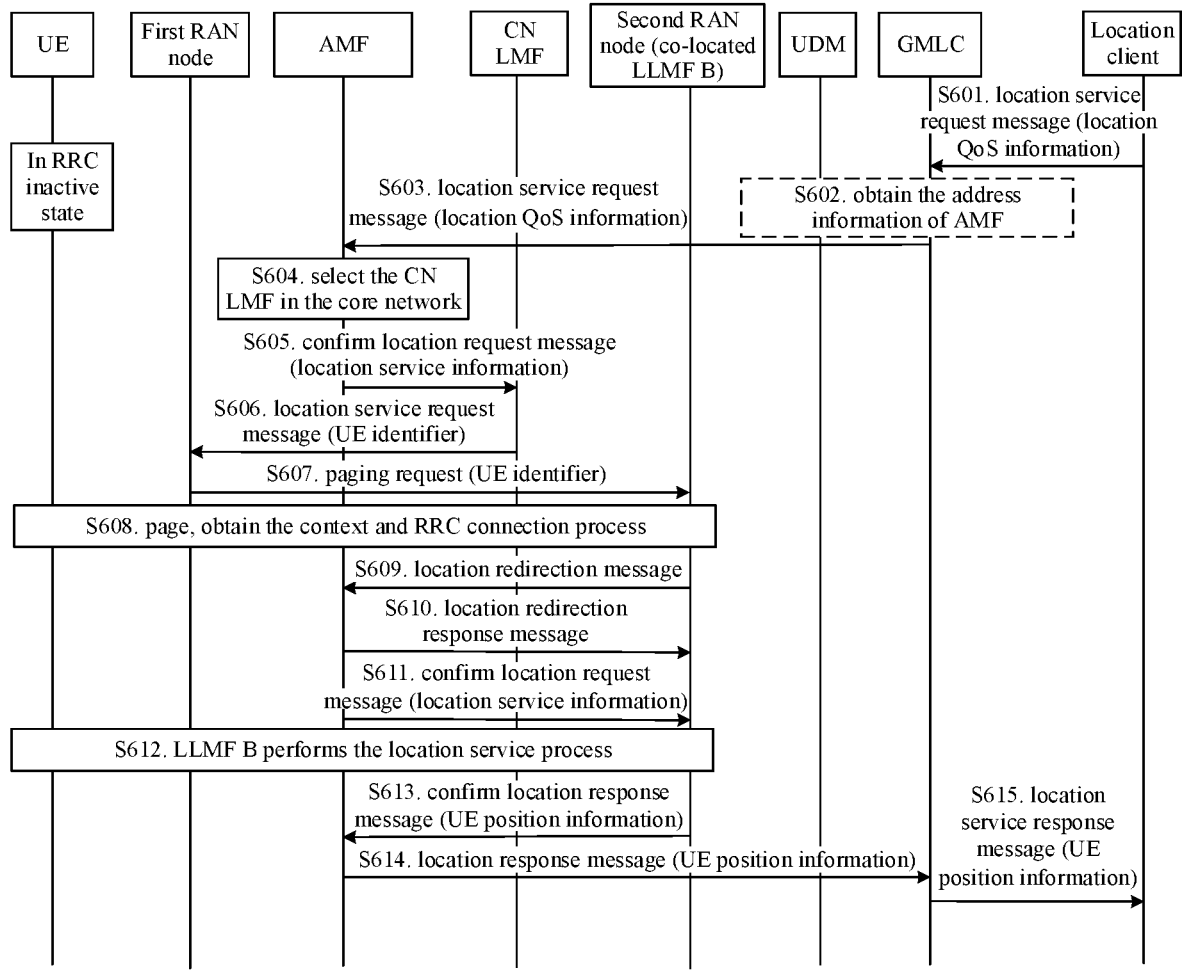
FIG. 6 is a signaling interaction diagram of an LMF selection method provided by an embodiment of the present application.

Referring to FIG. 6, it is a signaling interaction diagram of an LMF selection method provided by an embodiment of the present application.

As shown in the figure, the signaling interaction includes followings.

S601: a location client sends a location service request message to the GMLC, and the location service request message is used to request to obtain the position information of a target UE.

S602-S603: the GMLC sends a location service request message to the serving AMF of the target UE.

The specific implementations involved in S601 to S603 above are the same as the specific implementations involved in S401 to S403 in FIG. 4, and will not be repeated here.

S604: after receiving the location service request message sent by the GMLC, the AMF selects an LMF for the target UE in response to the location service request message. Here, the AMF chooses to use the CN LMF in the core network to provide the location service for the UE.

In one embodiment, the AMF may select an LMF for the target UE according to the original serving RAN node (first RAN node) of the target UE, the location QoS information, the location capabilities of LMFs in the area under the jurisdiction of the AMF, and the positioning type (such as instant positioning, delayed positioning, etc.).

In this step, the AMF determines that the LLMF A co-located with the first RAN node does not meet the location QoS requirement according to the location capabilities of the LMFs (including at least the LLMF A co-located with the first RAN node, and the CN LMF in the core network) in the area under its jurisdiction, the location QoS information of the target UE, the registered RAN node (here, the first RAN node) of the target UE stored by the AMF, and the positioning type, so the CN LMF in the core network is selected and used to provide the location service for the UE. Alternatively, the AMF determines that the first RAN node is configured with no co-located LLMF according to the information of the first RAN node, and therefore chooses to use the CN LMF in the core network to provide the location service for the UE. The AMF can also select the core network LMF for the UE according to the set location strategy.

S605: the AMF sends a confirm location request message to the CN LMF according to the CN LMF selected for the target UE.

Here, the confirm location request message carries the identifier of the target UE and the location service information of the target UE. In one embodiment, the location service information includes at least a location session identifier and the location QoS information.

In one embodiment, the confirm location request message sent by the AMF to the LLMF may be an Nlmf_Location_DetermineLocation Request message.

S606: the CN LMF receives the confirm location request message, and sends a location service request message to the first RAN node in response to the confirm location request message.

In this step, after the CN LMF receives the confirm location request message sent by the AMF, the AMF does not update the serving RAN node of the UE because the UE is currently in the RRC_INACTIVE state. In response, the CN LMF sends a location service request message to the first RAN node according to the information of the registered RAN node (first RAN node) of the target UE stored by the AMF, to attempt to obtain the position information of the target UE.

S607: after receiving the location service request message, the first RAN node requests other RAN nodes including the second RAN node to page the target UE in response to the location service request message.

In one embodiment, after receiving the location service request message sent by the CN LMF, the first RAN node attempts to obtain the position information of the target UE in response to the location service request message. Since the target UE is currently in the RRC_INACTIVE state, the first RAN node is triggered to recover the RRC connection with the target UE; and in response, the first RAN node sends a paging request (RAN Paging) to the RAN nodes in the RNA where the first RAN node is located, where the paging request carries the identifier of the target UE to request other RAN nodes to page the target UE, and the second RAN node is included in the RNA where the first RAN node is located.

S608: the second RAN node pages the target UE after receiving the paging request sent by the first RAN node, and then triggers the signaling interaction between the target UE and the second RAN node to complete the establishment or activation of the RRC connection, and the signaling interaction between the second RAN node and the first RAN node to complete the acquisition of the UE context information.

The specific implementations involved in S608 above are the same as the specific implementations involved in S407 in FIG. 4, and will not be repeated here.

S609-S611: the second RAN node sends a location redirection message to the AMF, and the AMF sends a location redirection response message and a confirm location request message to the second RAN node.

In one embodiment, the confirm location request message may be an Nlmf_Location_DetermineLocation Request message.

S609-S611 may include two implementation modes.

In a first mode: the location redirection message sent by the second RAN node or its co-located LLMF B to the AMF is a location redirection notification message, such as an LMF Redirection Notify message (LMF redirection notification message), to obtain the AMF's understanding; where the specific implementations involved in this mode are the same with the specific implementations involved in the first mode in S408-S409 of FIG. 4, and will not be repeated here.

In a second mode: the location redirection message sent by the second RAN node or its co-located LLMF B to the AMF is a location redirection request message, such as an LMF Redirection Require message (LMF redirection request message), to request the AMF to select an LMF that provides the location service for the target UE; where the specific implementations involved in this mode are the same with the specific implementations involved in the second mode in S408-S409 of FIG. 4, and will not be repeated here.

In one embodiment, after receiving the location redirection message sent by the second RAN node, the AMF may send a location redirection message (LMF Redirection Notify) to the CN LMF to notify the CN LMF that the LMF providing the location service for the UE is the LLMF B co-located with the second RAN node, where the location redirection message may be an LMF Redirection Notify message (LMF redirection notification message).

In one embodiment, the content carried in S610 and S611 may be carried in a message and sent to the LLMF B. For example, the AMF sends a confirm location request message to the LLMF B, where the confirm location request message is used to respond to the location redirection message sent by the LLMF B in S609 and notify the LLMF B to provide the location service for the target UE.

S612: the LLMF B executes a location service process in response to the received confirm location request message or redirection command to obtain the position information of the target UE.

S613: the LLMF B sends a confirm location response message to the AMF after obtaining the position information of the UE, where the confirm location response message carries the position information of the UE.

S614: the AMF sends a location service response message to the GMLC after receiving the confirm location response message, where the location service response message carries the position information of the UE.

S615: the GMLC sends a location service response message to the location client after receiving the location service response message, where the location service response message carries the position information of the UE.

The specific implementations involved in S612 to S615 above are the same as the specific implementations involved in S410 to S413 in FIG. 4, and will not be repeated here.

At this point, the LLMF B re-selected by the AMF completes the location service provided for the UE.

Based on the signaling interaction diagrams shown in FIG. 6 and FIG. 5, in an achievable mode, in S608, the first RAN node can select the LLMF B co-located with the second RAN node to provide the location service for the target UE and send the indication information that the LLMF B provide the location service for the target UE to the second RAN node (for example, carry the indication information in the context response message), so that the LLMF B executes the content performed in S612-S615 to complete the location service provided for the UE; or, the first RAN node sends the location service information of the target UE to the second RAN node to trigger the second RAN node to select the LLMF B to provide the location service for the target UE, so that the LLMF B executes the content performed in S612-S615 to complete the location service provided for the UE.

In the above embodiments, the AMF selects the CN LMF in the core network to provide the location service within the jurisdiction of the first RAN node. When the first RAN node detects that the target UE is in the RRC_INACTIVE state and determines through paging that the RAN node where the UE currently resides is the second RAN node when the CN LMF performs the location service process, the first RAN node or the AMF or the second RAN node is triggered to reselect the LLMF B to provide the location service for the UE; in this way, even if the CN LMF of the core network provides the location service for the UE within the jurisdiction of the original serving RAN node, the LLMF with higher location accuracy and lower delay can be flexibly selected to provide the location service for the UE when both the location capability of the LLMF co-located with the target serving RAN node and the location capability of the CN LMF of the core network meet the location requirement.

It should be noted that S601 is an optional step. That is, the location service request for the target UE may be initiated by the location client, or may be actively initiated by the network side. For example, the GMLC needs to obtain the position information of the target UE based on the strategy or configuration of the network side, and then actively initiates a location service request for the target UE. This is not limited in the present application.

It should be noted that the signaling interaction sequence in the signaling interaction diagram is only an example, and does not strictly represent the sequence of signaling interaction in actual applications.

It should also be noted that the message naming in the signaling interaction diagram is only an example, and other naming methods may be used for naming, which is not limited in the present application.

Based on the signaling interaction diagram shown in FIG. 3, in an achievable mode, the RAN node (second RAN node) where the target UE currently resides is configured with no co-located LLMF, or the co-located LLMF B does not meet the location requirement of the UE. In this case, the location client initiates a location service request for the target UE, and the AMF firstly selects the CN LMF in the core network to provide the location service for the target UE. After knowing that the UE currently resides on the second RAN node, the first RAN node can trigger the AMF to reselect the CN LMF in the core network to provide the location service for the UE.

Figure 7:
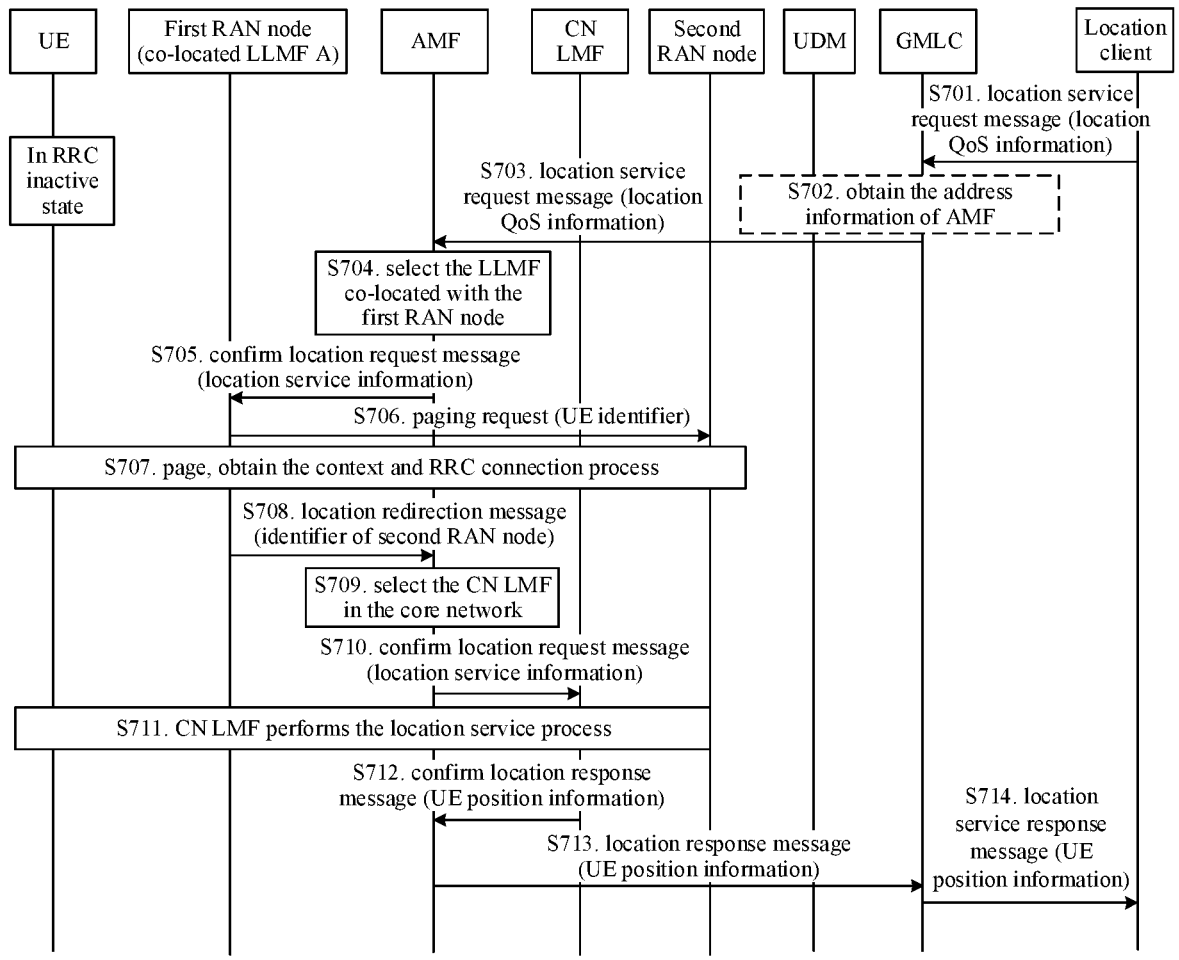
FIG. 7 is a signaling interaction diagram of an LMF selection method provided by an embodiment of the present application.

Referring to FIG. 7, it is a signaling interaction diagram of an LMF selection method provided by an embodiment of the present application.

As shown in the figure, the signaling interaction includes followings.

S701: a location client sends a location service request message to the GMLC, and the location service request message is used to request to obtain the position information of a target UE.

S702-S703: the GMLC sends a location service request message to the serving AMF of the target UE.

S704: after receiving the location service request message sent by the GMLC, the AMF selects an LMF for the target UE in response to the location service request message. Here, the AMF chooses to use the LLMF A co-located with the first RAN node to provide the location service for the target UE.

S705: the AMF sends a confirm location request message to the first RAN node or the LLMF A co-located with the first RAN node according to the LLMF co-located with the first RAN node selected for the target UE.

S706: the first RAN node detects that the target UE is in the RRC_INACTIVE state, and then requests other RAN nodes including the second RAN node to page the target UE.

S707: the second RAN node pages the target UE after receiving the paging request sent by the first RAN node, and then triggers the signaling interaction between the target UE and the second RAN node to complete the establishment or recovery of the RRC connection, and the signaling interaction between the second RAN node and the first RAN node to complete the acquisition of the UE context information.

S708: the first RAN node sends a location redirection message to the AMF.

The specific implementations involved in S701 to S708 above are the same as the specific implementations involved in S301 to S308 in FIG. 3, and will not be repeated here.

S709: after receiving the location redirection message, the AMF reselects an LMF for the target UE in response to the location redirection message. Here, the AMF selects the CN LMF in the core network to provide the location service for the target UE.

In this step, the AMF can determine that the LLMF B co-located with the second RAN node (not shown in the figure) does not meet the location QoS requirement according to the information of the second RAN node where the target UE resides and the location service information, and thus select the CN LMF in the core network to provide the location service for the UE. Alternatively, the AMF can determine that the second RAN node is configured with no co-located LLMF according to the information of the second RAN node where the target UE resides and the location QoS information, and thus select the CN LMF in the core network to provide the location service for the UE. Alternatively, the AMF can also select the core network LMF for the UE according to the set location strategy.

S710: the AMF sends a confirm location request message to the CN LMF in the core network.

In this step, the AMF selects the CN LMF in the core network to provide the location service for the UE, so the AMF sends a confirm location request message to the CN LMF to request the CN LMF to provide the location service for the UE.

In one embodiment, the confirm location request message sent by the AMF may be an Nlmf_Location_DetermineLocation Request message.

S711: the CN LMF executes a location service process in response to the received confirm location request message to obtain the position information of the UE.

S712: the CN LMF sends a confirm location response message to the AMF after obtaining the position information of the UE, where the confirm location response message carries the position information of the UE.

In one embodiment, the confirm location response message sent by the CN LMF may be an Nlmf_Location_DetermineLocation Response message.

S713: the AMF sends a location service response message to the GMLC after receiving the confirm location response message, where the location service response message carries the position information of the UE.

S714: the GMLC sends a location service response message to the location client after receiving the location service response message, where the location service response message carries the position information of the UE.

The specific implementations involved in S713 to S714 above are the same as the specific implementations involved in S312 to S313 in FIG. 3, and will not be repeated here.

At this point, the CN LMF re-selected by the AMF completes the location service for the UE.

Based on the signaling interaction diagrams shown in FIG. 7 and FIG. 4, in an achievable mode, the second RAN node sends the location service information of the target UE to the first RAN node after determining that the RAN node where the target UE resides is the first RAN node, so that the second RAN node sends a location redirection message to the AMF to trigger the AMF to choose to use the CN LMF in the core network to provide the location service for the UE after determining that the co-located LLMF B does not meet the location requirement or determining that no co-located LLMF is not set according to the received location service information of the UE and the information of the second RAN node, and then S710-S714 are executed to complete the location service provided by the CN LMF for the UE.

In the above embodiments, when the first RAN node detects that the target UE is in the RRC_INACTIVE state and determines through paging that the RAN node where the UE currently resides is the second RAN node when the LLMF A performs the location service process, the first RAN node or the second RAN node is triggered to send a location redirection message to the AMF, so that the AMF selects the CN LMF in the core network that meets the location requirement to provide the location service for the UE; in this way, even if the LLMF co-located with the original serving RAN node provides the location service for the UE within the jurisdiction of the original serving RAN node, the CN LMF in the core network can be flexibly selected to provide the location service for the UE when the location capability of the LLMF co-located with the target serving RAN node does not meet the location requirement or the target serving RAN is configured with no co-located LLMF, to ensure that the location requirement of the UE is met.

It should be noted that S701 is an optional step. That is, the location service request for the target UE may be initiated by the location client, or may be actively initiated by the network side. For example, the GMLC needs to obtain the position information of the target UE based on the strategy or configuration of the network side, and then actively initiates a location service request for the target UE. This is not limited in the present application.

It should be noted that the signaling interaction sequence in the signaling interaction diagram is only an example, and does not strictly represent the sequence of signaling interaction in actual applications.

It should also be noted that the message naming in the signaling interaction diagram is only an example, and other naming methods may be used for naming, which is not limited in the present application.

In an achievable mode, based on the signaling interaction diagrams shown in FIG. 6 and FIG. 7, the location client initiates a location service request for the target UE, and the AMF firstly selects the CN LMF in the core network to provide the location service for the target UE. In this case, the second RAN node where the target UE currently resides is configured with no co-located LLMF B or the co-located LLMF B does not meet the location QoS requirement of the UE, so the AMF can re-determine that the CN LMF provides the location service for the UE, send the identifier of the second RAN node to the CN LMF, and trigger the CN LMF to execute the location service process of the UE, to ensure that the location requirement of the UE is met.

It should be noted that the paging request message sent by the original serving RAN node of the target terminal to the RAN node in the RNA where the original serving RAN node is located in the paging process also carries the paging reason in addition to the identifier of the target terminal. The paging reason involved in the embodiments of the present application refers to providing the location service for the target terminal, so the paging reason carried in the paging request message can include the location service information of the target terminal, the location capability of the LLMF co-located with the original serving RAN node, etc., so that the RAN node where the target terminal currently resides can select an LMF that provides the location service for the target terminal according to the paging reason.

One embodiment of the present application further provides a mobility management function entity device, which can implement the processes executed in the foregoing implementations.

Figure 8:
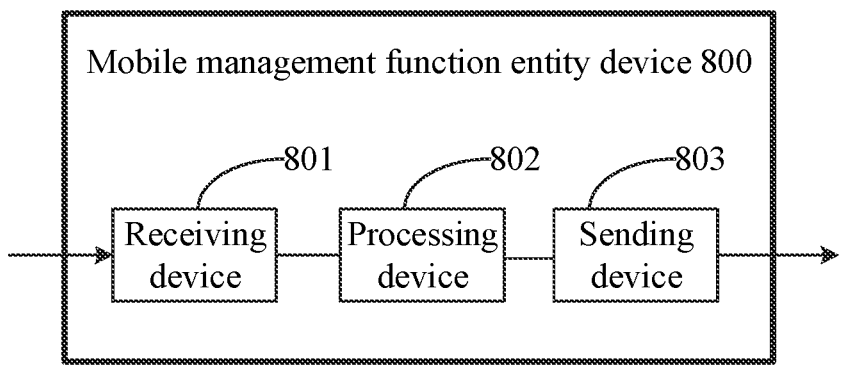
FIG. 8 is a structural schematic diagram of a mobility management function entity device provided by an embodiment of the present application.

As shown in FIG. 8, it is a structural schematic diagram of a mobility management function entity device provided by an embodiment of the present application.

As shown in the figure, the mobile management function entity device 800 includes a receiving device 801, a processing device 802 and a sending device 803.

The receiving device 801 is configured to: receive a location service request message from a GMLC, and the location service request message is used to request to select an LMF for a target terminal.

The processing device 802 is configured to: select a first LMF to provide the location service for the target terminal in response to the location service request message, and send a confirm location request message to the first LMF through the sending device 803, and the first LMF is a core network LMF or a local LMF associated with a first access node.

The receiving device 801 is further configured to: receive a location redirection message from the first access node or a second access node; and the location redirection message sent by the first access node is sent after the first access node requests at least the second access node to page the target terminal and determines that the target terminal currently resides on the second access node, and the location redirection message sent by the second access node is sent after the second access node pages the target terminal in response to a paging request of the first access node.

The processing device 802 is further configured to: send a confirm location request message to a second LMF through the sending device in response to the location redirection message, and the second LMF is selected by the first access node or the mobility management function entity for the target terminal, and the second LMF is a core network LMF or a local LMF associated with the second access node.

The receiving device 801 is further configured to: receive a confirm location response message sent by the second LMF, and the confirm location response message carries the position information of the target terminal.

The sending device 803 is further configured to: send a location service response message to the GMLC after receiving the confirm location response message sent by the second LMF, and the location service response message carries the position information of the target terminal.

In one embodiment, the location service request message carries an identifier of the target terminal and the location QoS information of the target terminal;
   the processing device selects the first LMF to provide the location service for the target terminal in response to the location service request message, including:
   the processing device selects the first LMF to provide the location service for the target terminal according to the location QoS information and location capabilities of LMFs managed by the mobility management function entity in response to the location service request message.

In one embodiment, the confirm location request message sent to the first LMF and the confirm location request message sent to the second LMF carry an identifier of the target terminal and the location service information of the target terminal, and the location service information includes at least a location session identifier and the location QoS information of the target terminal.

In one embodiment, the location redirection message carries an identifier of the second access node and an identifier of the target terminal.

In one embodiment, the mobility management function entity is an Access mobility Management Function (AMF) entity or a Mobility Management Function (MME) entity.

One embodiment of the present application further provides an access node device, which can implement the processes executed in the foregoing implementations.

Figure 9:
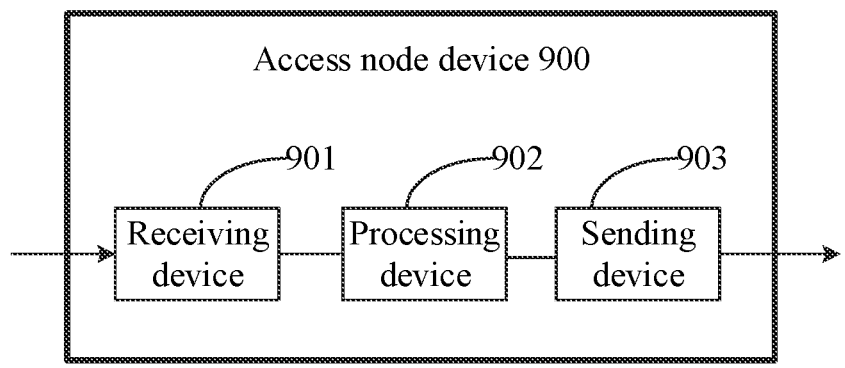
FIG. 9 is a structural schematic diagram of an access node device provided by an embodiment of the present application.

As shown in FIG. 9, it is a structural schematic diagram of an access node device provided by an embodiment of the present application.

As shown in the figure, the access node device 900 includes: a receiving device 901, a processing device 902 and a sending device 903.

The processing device 902 is configured to: request at least a second access node to page a target terminal through the sending device when a first LMF selected by a mobility management function entity for the target terminal initiates a location service process of the target terminal; and the first LMF is a core network LMF or a local LMF associated with the first access node.

The receiving device 901 is configured to: receive a context request message sent by the second access node after paging the target terminal.

The sending device 903 is configured to: send the location service information of the target terminal to the second access node or send a location redirection message to the mobility management function entity after receiving a context request message sent by the second access node after paging the target terminal, and the location redirection message is used to notify the first access node of a second LMF associated with the second access node selected for the target terminal or request the mobility management function entity to reselect an LMF for the target terminal.

In one embodiment, before the sending device requests at least the second access node to page the target terminal, the process further includes:
   the receiving device receives a confirm location request message sent by the mobility management function entity, and the confirm location request message carries an identifier of the target terminal and the location service information of the target terminal.

In one embodiment, the sending device sends the location service information of the target terminal to the second access node after the receiving device receives the context request message sent by the second access node after paging the target terminal, including:
   the sending device sends a context response message to the second access node after the receiving device receives a context request message sent by the second access node after paging the target terminal, and the context response message carries the context information of the target terminal and the location service information of the target terminal; or
   the sending device sends a context response message and a location redirection message to the second access node after the receiving device receives a context request message sent by the second access node after paging the target terminal, and the context response message carries the context information of the target terminal, and the location redirection message carries the location service information of the target terminal.

In one embodiment, the sending device requests at least the second access node to page the target terminal, including:

the sending device requests an access node in a notification area where the first access node is located to page the target terminal, and the notification area where the first access node is located includes the second access node.

In one embodiment, the location service information includes at least a location session identifier and the location QoS information of the target terminal.

In one embodiment, the location redirection message carries an identifier of the second access node and an identifier of the target terminal.

One embodiment of the present application further provides an access node device, which can implement the processes executed in the foregoing implementations.

Figure 10:
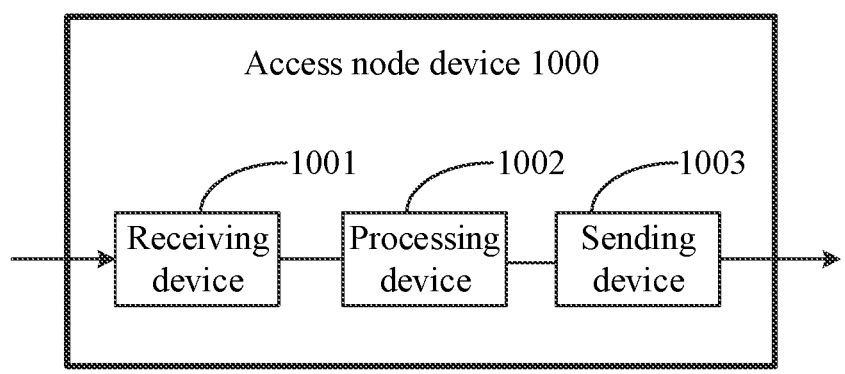
FIG. 10 is a structural schematic diagram of an access node device provided by an embodiment of the present application.

As shown in FIG. 10, it is a structural schematic diagram of an access node device provided by an embodiment of the present application.

As shown in the figure, the access node device 1000 includes: a receiving device 1001, a processing device 1002 and a sending device 1003.

The processing device 1002 is configured to: page a target terminal through the sending device according to a paging request sent by a first access node where the target terminal originally resided and received by the receiving device; and the paging request is sent by the first access node when a first LMF initiates a location service process of the target terminal, the first LMF is a core network LMF or a local LMF associated with the first access node, and the first LMF is selected by a mobility management function entity to provide the location service for the target terminal.

The receiving device 1001 is further configured to: receive the location service information of the target terminal sent by the first access node or the mobility management function entity, so that a local LMF associated with the second access node initiates a location service process of the target terminal after the second access node establishes an RRC connection with the target terminal.

In one embodiment, before the receiving device receives the location service information of the target terminal sent by the mobility management function entity, the process further includes:

the sending device sends a location redirection message to the mobility management function entity;

the receiving device receives the location service information of the target terminal sent by the mobility management function entity, including:

the receiving device receives a location redirection response message sent by the mobility management function entity in response to the location redirection message, and the location redirection response message carries the location service information of the target terminal.

In one embodiment, the process further includes:

the sending device sends a context request message to the first access node after paging the target terminal;

the receiving device receives the location service information of the target terminal sent by the first access node, including:

the receiving device receives a context response message sent by the first access node, and the context response message carries the context information of the target terminal and the location service information of the target terminal; or the receiving device receives a context response message and a location redirection message sent by the first access node, and the context response message carries the context information of the target terminal, and the location redirection message carries the location service information of the target terminal.

In one embodiment, the location service information includes at least a location session identifier and the location QoS information of the target terminal.

In one embodiment, the location redirection message carries an identifier of the second access node and an identifier of the target terminal.

One embodiment of the present application further provides a communication device, which can implement the process performed in FIG. 8 in foregoing embodiments.

Figure 11:
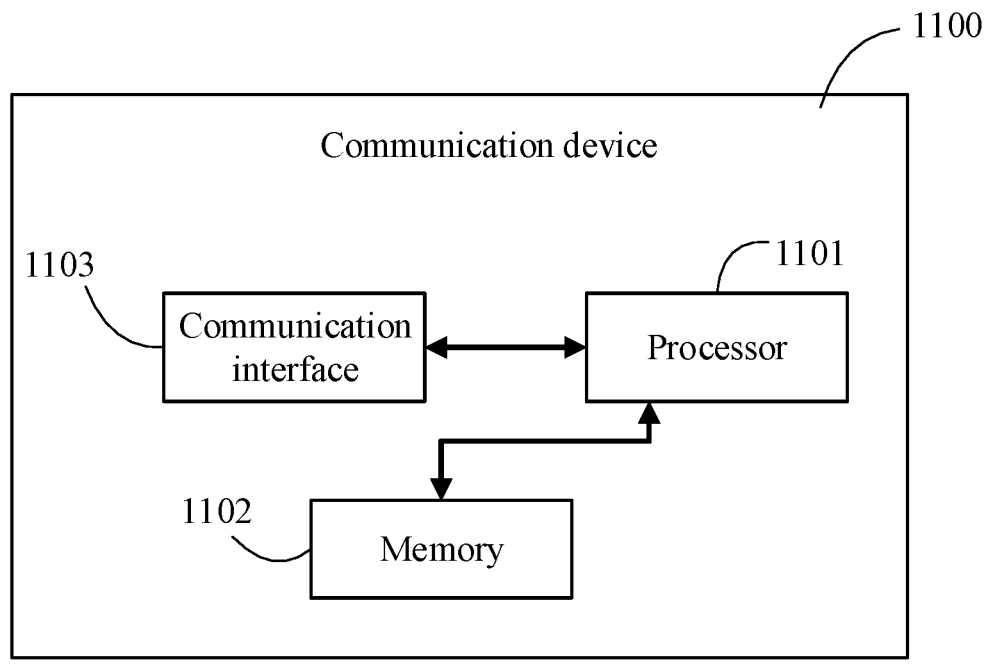
FIG. 11 is a structural schematic diagram of a communication device provided by an embodiment of the present application.

FIG. 11 shows a structural schematic diagram of a communication device 1100 provided by an embodiment of the present application, that is, shows another structural schematic diagram of the mobility management function entity device 800. Referring to FIG. 11, the communication device 1100 includes a processor 1101 and a memory 1102, and may In one embodiment further include a communication interface 1103, and the processor 1101 may also be a controller. The processor 1101 is configured to support the terminal to perform the functions involved in the foregoing process. The memory 1102 is configured to couple with the processor 1101, and store the necessary program instructions and data for the terminal, and the processor 1101 is connected to the memory 1102, the memory 1102 is configured to store instructions, and the processor 1101 is configured to execute the instructions stored in the memory 1102 to complete the steps of the client device to perform the corresponding functions in the foregoing method.

In some embodiments of the present application, the concepts, explanations and detailed descriptions as well as other steps involved by the mobile management function entity device 800 and the communication device 1100 and related to the embodiments provided in the present application refer to the description related to these content in the foregoing methods or other embodiments, and will not be repeated here.

It should be noted that the above processor involved in the embodiments of the present application may be Central Processing Unit (CPU), general-purpose processor, Digital Signal Processor (DSP), Application-Specific Integrated Circuit (ASIC), Field Programmable Gate Array (FPGA), or other programmable logic device, transistor logic device, hardware component or any combination thereof. It can implement or execute various exemplary logical blocks, modules and circuits described in combination with the content of the present application. The processor may also be a combination of implementing the computing functions, for example, a combination of one or more microprocessors, a combination of a DSP and a microprocessor, and so on, and the memory may be integrated in the processor, or may be provided separately from the processor.

In one embodiment, the processor 1101 is configured to read the program in the memory 1102 to:

receive a location service request message from a Gateway Mobile Location Center, GMLC, and the location service request message is used to request to select an LMF for a target terminal;

select a first LMF to provide a location service for the target terminal in response to the location service request message, and send a confirm location request message to the first LMF, and the first LMF is a core network LMF or a local LMF associated with a first access node;

receive a location redirection message from the first access node or a second access node; and the location redirection message sent by the first access node is sent after the first access node requests at least the second access node to page the target terminal and determines that the target terminal currently resides on the second access node, and the location redirection message sent by the second access node is sent after the second access node pages the target terminal in response to a paging request of the first access node;

send a confirm location request message to a second LMF in response to the location redirection message, and the second LMF is selected by the first access node or the mobility management function entity for the target terminal, and the second LMF is a core network LMF or a local LMF associated with the second access node;

receive a confirm location response message sent by the second LMF, and send a location service response message to the GMLC, and the confirm location response message and the location service response message carry position information of the target terminal.

In one embodiment, the location service request message carries an identifier of the target terminal and the location QoS information of the target terminal;

when selecting the first LMF to provide the location service for the target terminal in response to the location service request message, the processor is configured to:

select the first LMF to provide the location service for the target terminal according to the location QoS information and location capabilities of LMFs managed by the mobility management function entity in response to the location service request message.

In one embodiment, the confirm location request message sent by the processor to the first LMF and the confirm location request message sent to the second LMF carry an identifier of the target terminal and the location service information of the target terminal, and the location service information includes at least a location session identifier and the location QoS information of the target terminal.

In one embodiment, the location redirection message carries an identifier of the second access node and an identifier of the target terminal.

In one embodiment, the mobility management function entity is an Access mobility Management Function (AMF) entity or a Mobility Management Function (MME) entity.

One embodiment of the present application further provides a communication device, which can implement the process performed in FIG. 9 in the foregoing embodiment.

Figure 12:
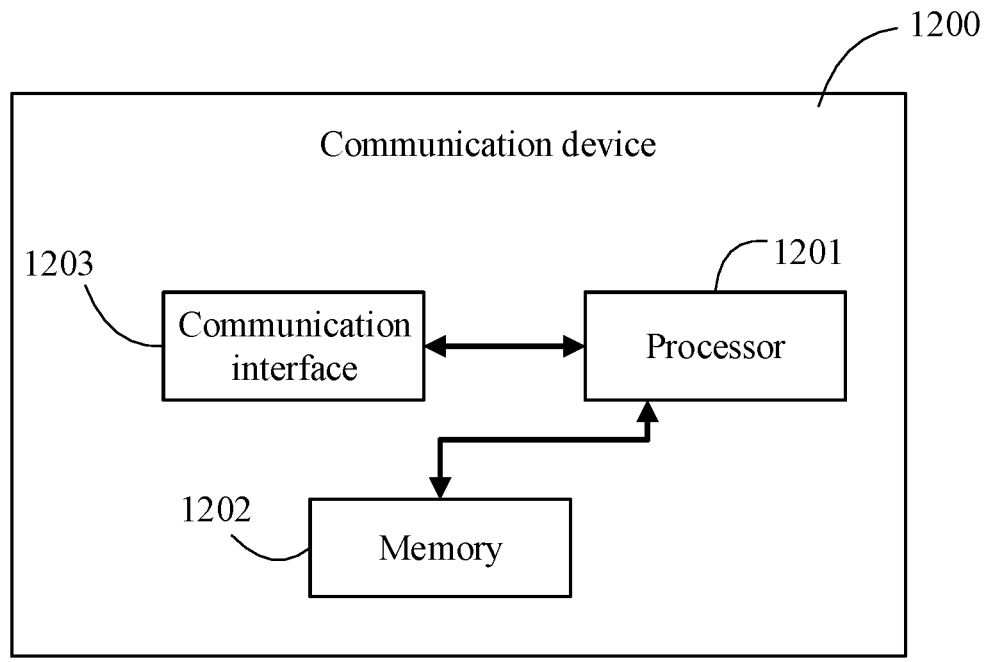
FIG. 12 is a structural schematic diagram of a communication device provided by an embodiment of the present application.

FIG. 12 shows a structural schematic diagram of a communication device 1200 provided by an embodiment of the present application, that is, shows another structural schematic diagram of the access node device 900. Referring to FIG. 12, the communication device 1200 includes a processor 1201 and a memory 1202, and may In one embodiment further include a communication interface 1203, and the processor 1201 may also be a controller. The processor 1201 is configured to support the terminal to perform the functions involved in the foregoing process. The memory 1202 is configured to couple with the processor 1201, and store the necessary program instructions and data for the terminal, and the processor 1201 is connected to the memory 1202, the memory 1202 is configured to store instructions, and the processor 1201 is configured to execute the instructions stored in the memory 1202 to complete the steps of the client device to perform the corresponding functions in the foregoing method.

In some embodiments of the present application, the concepts, explanations and detailed descriptions as well as other steps involved by the access node device 900 and the communication device 1200 and related to the embodiment of the present application refer to the description related to these content in the foregoing methods or other embodiments, and will not be repeated here.

It should be noted that the above processor involved in the embodiments of the present application may be Central Processing Unit (CPU), general-purpose processor, Digital Signal Processor (DSP), Application-Specific Integrated Circuit (ASIC), Field Programmable Gate Array (FPGA), or other programmable logic device, transistor logic device, hardware component or any combination thereof. It can implement or execute various exemplary logical blocks, modules and circuits described in combination with the content of the present application. The processor may also be a combination of implementing the computing functions, for example, a combination of one or more microprocessors, a combination of a DSP and a microprocessor, and so on, and the memory may be integrated in the processor, or may be provided separately from the processor.

In one embodiment, the processor 1201 is configured to read the program in the memory 1202 to:

request at least a second access node to page a target terminal when a first LMF selected by a mobility management function entity for the target terminal initiates a location service process of the target terminal; and the first LMF is a core network LMF or a local LMF associated with the first access node;

send location service information of the target terminal to the second access node or send a location redirection message to the mobility management function entity after receiving a context request message sent by the second access node after paging the target terminal, and the location redirection message is used to notify the first access node of a second LMF associated with the second access node selected for the target terminal or request the mobility management function entity to reselect an LMF for the target terminal.

In one embodiment, before requesting at least the second access node to page the target terminal, the processor is further configured to:

receive a confirm location request message sent by the mobility management function entity, and the confirm location request message carries an identifier of the target terminal and the location service information of the target terminal.

In one embodiment, when sending the location service information of the target terminal to the second access node after receiving the context request message sent by the second access node after paging the target terminal, the processor is configured to:

send a context response message to the second access node after receiving a context request message sent by the second access node after paging the target terminal, and the context response message carries the context information of the target terminal and the location service information of the target terminal; or send a context response message and a location redirection message to the second access node after receiving a context request message sent by the second access node after paging the target terminal, and the context response message carries the context information of the target terminal, and the location redirection message carries the location service information of the target terminal.

In one embodiment, when requesting at least the second access node to page the target terminal, the processor is configured to:
request an access node in a notification area where the first access node is located to page the target terminal, and the notification area where the first access node is located includes the second access node.

In one embodiment, the location service information includes at least a location session identifier and the location QoS information of the target terminal.

In one embodiment, the location redirection message carries an identifier of the second access node and an identifier of the target terminal.

One embodiment of the present application further provides a communication device, which can implement the process performed in FIG. 10 in the foregoing embodiments.

Figure 13:
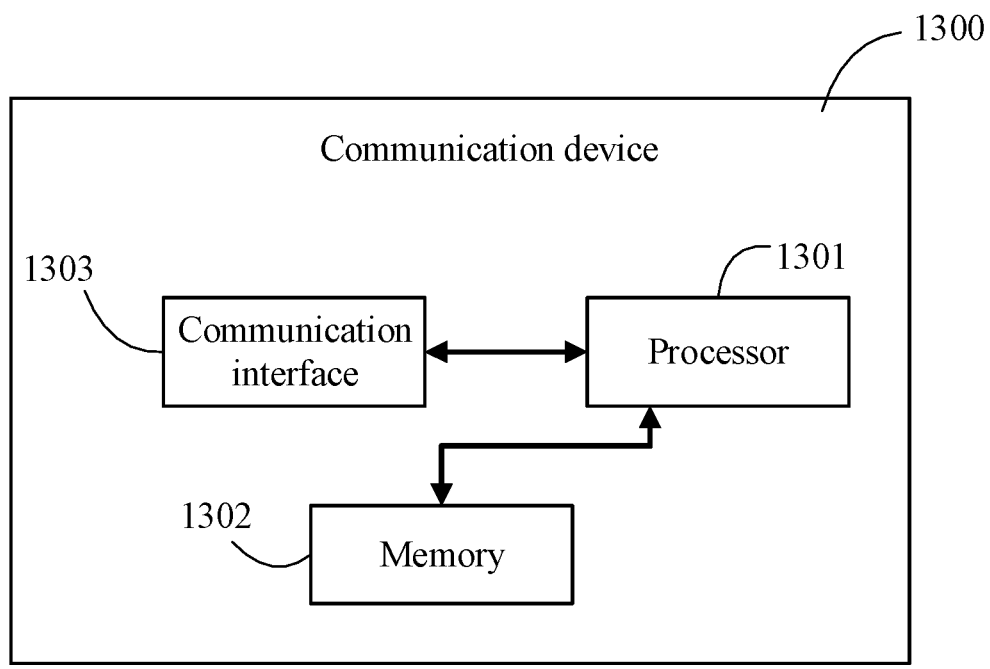
FIG. 13 is a structural schematic diagram of a communication device provided by an embodiment of the present application.

FIG. 13 shows a structural schematic diagram of a communication device 1300 provided by an embodiment of the present application, that is, shows another structural schematic diagram of the access node device 1000. Referring to FIG. 13, the communication device 1300 includes a processor 1301 and a memory 1302, and may In one embodiment further include a communication interface 1303, and the processor 1301 may also be a controller. The processor 1301 is configured to support the terminal to perform the functions involved in the foregoing process. The memory 1302 is configured to couple with the processor 1301, and store the necessary program instructions and data for the terminal, and the processor 1301 is connected to the memory 1302, the memory 1302 is configured to store instructions, and the processor 1301 is configured to execute the instructions stored in the memory 1302 to complete the steps of the client device to perform the corresponding functions in the foregoing method.

In embodiments of the present application, the concepts, explanations and detailed descriptions as well as other steps involved by the access node device 1000 and the communication device 1300 and related to embodiments of the present application refer to the description related to these content in the foregoing methods or other embodiments, and will not be repeated here.

It should be noted that the above processor involved in the embodiments of the present application may be Central Processing Unit (CPU), general-purpose processor, Digital Signal Processor (DSP), Application-Specific Integrated Circuit (ASIC), Field Programmable Gate Array (FPGA), or other programmable logic device, transistor logic device, hardware component or any combination thereof. It can implement or execute various exemplary logical blocks, modules and circuits described in combination with the content of the present application. The processor may also be a combination of implementing the computing functions, for example, a combination of one or more microprocessors, a combination of a DSP and a microprocessor, and so on, and the memory may be integrated in the processor, or may be provided separately from the processor.

In one embodiment, the processor 1301 is configured to read the program in the memory 1302 to:
page a target terminal after receiving a paging request sent by a first access node where the target terminal originally resided; and the paging request is sent by the first access node when a first Location Management Function, LMF, initiates a location service process of the target terminal, the first LMF is a core network LMF or a local LMF associated with the first access node, and the first LMF is selected by a mobility management function entity to provide a location service for the target terminal;
receive location service information of the target terminal sent by the first access node or the mobility management function entity, so that a local LMF associated with the second access node initiates a location service process of the target terminal after the second access node establishes an RRC connection with the target terminal.

In one embodiment, before receiving the location service information of the target terminal sent by the mobility management function entity, the processor is further configured to:
send a location redirection message to the mobility management function entity;
when receiving the location service information of the target terminal sent by the mobility management function entity, the processor is configured to:
receive a location redirection response message sent by the mobility management function entity in response to the location redirection message, and the location redirection response message carries the location service information of the target terminal.

In one embodiment, the processor is further configured to:
send a context request message to the first access node after paging the target terminal;
when receiving the location service information of the target terminal sent by the first access node, the processor is configured to:
receive a context response message sent by the first access node, and the context response message carries the context information of the target terminal and the location service information of the target terminal; or
receive a context response message and a location redirection message sent by the first access node, and the context response message carries the context information of the target terminal, and the location redirection message carries the location service information of the target terminal.

In one embodiment, the location service information includes at least a location session identifier and the location QoS information of the target terminal.

In one embodiment, the location redirection message carries an identifier of the second access node and an identifier of the target terminal.

One embodiment of the present application further provides a computer readable storage medium. The computer readable storage medium stores computer executable instructions that are configured to cause a computer to perform the process executed in FIG. 8.

One embodiment of the present application further provides a computer readable storage medium. The computer readable storage medium stores computer executable instructions that are configured to cause a computer to perform the process executed in FIG. 9.

One embodiment of the present application further provides a computer readable storage medium. The computer readable storage medium stores computer executable instructions that are configured to cause a computer to perform the process executed in FIG. 10.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A Location Management Function, LMF, selection method, comprises:
   receiving, by a mobility management function entity, a location service request message from a Gateway Mobile Location Center, GMLC, wherein the location service request message is used to request to select an LMF for a target terminal;
   selecting, by the mobility management function entity, a first LMF to provide a location service for the target terminal in response to the location service request message, and sending a confirm location request message to the first LMF, wherein the first LMF is a core network LMF or a local LMF associated with a first access node;
   receiving, by the mobility management function entity, a location redirection message from the first access node or a second access node; wherein the location redirection message sent by the first access node is sent after the first access node requests at least the second access node to page the target terminal and determines that the target terminal currently resides on the second access node, and the location redirection message sent by the second access node is sent after the second access node pages the target terminal in response to a paging request of the first access node;
   sending, by the mobility management function entity, a confirm location request message to a second LMF in response to the location redirection message, wherein the second LMF is selected by the first access node or the mobility management function entity for the target terminal, and the second LMF is a core network LMF or a local LMF associated with the second access node;
   receiving, by the mobility management function entity, a confirm location response message sent by the second LMF, and sending a location service response message to the GMLC, wherein the confirm location response message and the location service response message carry position information of the target terminal.

2. The method according to claim 1, wherein the location service request message carries an identifier of the target terminal and location Quality of Service, QoS, information of the target terminal;
   the selecting, by the mobility management function entity, a first LMF to provide a location service for the target terminal in response to the location service request message, comprises:
   selecting, by the mobility management function entity, the first LMF to provide the location service for the target terminal according to the location QoS information and location capabilities of LMFs managed by the mobility management function entity in response to the location service request message.

3. The method according to of claim 1, wherein the confirm location request message sent to the first LMF and the confirm location request message sent to the second LMF carry an identifier of the target terminal and location service information of the target terminal, wherein the location service information comprises at least a location session identifier and location QoS information of the target terminal.

4. The method according to claim 1, wherein the location redirection message carries an identifier of the second access node and an identifier of the target terminal.

5. The method according to claim 1, wherein the mobility management function entity is an Access mobility Management Function, AMF, entity or a Mobility Management Function, MME, entity.

6. A communication device applied to a mobility management function entity, comprises: a processor, a memory and a communication interface;
   the memory is configured to store computer instructions;
   the processor is configured to read a program in the memory to implement the method of claim 1.

7. The communication device according to claim 6, wherein the location service request message carries an identifier of the target terminal and location Quality of Service, QoS, information of the target terminal;
   the processor is configured to select the first LMF to provide the location service for the target terminal in response to the location service request message, by:
   selecting the first LMF to provide the location service for the target terminal according to the location QoS information and location capabilities of LMFs managed by the mobility management function entity in response to the location service request message.

* * * * *